(12) United States Patent
Karanam et al.

(10) Patent No.: US 9,639,949 B2
(45) Date of Patent: May 2, 2017

(54) EDGE ORIENTATION FOR SECOND DERIVATIVE EDGE DETECTION METHODS

(75) Inventors: Gopal Karanam, Bangalore (IN); Benno Kusstatscher, Munich (DE)

(73) Assignee: ANALOG DEVICES, INC., Norwood, MA (US)

( * ) Notice: Subject to any disclaimer, the term of this patent is extended or adjusted under 35 U.S.C. 154(b) by 773 days.

(21) Appl. No.: 12/661,335

(22) Filed: Mar. 15, 2010

(65) Prior Publication Data

US 2011/0222779 A1  Sep. 15, 2011

(51) Int. Cl.
*G06K 9/48* (2006.01)
*G06T 7/00* (2017.01)

(52) U.S. Cl.
CPC .................. *G06T 7/0085* (2013.01)

(58) Field of Classification Search
None
See application file for complete search history.

(56) References Cited

U.S. PATENT DOCUMENTS

| | | |
|---|---|---|
| 4,557,602 A | 12/1985 | Ueda |
| 5,142,592 A | 8/1992 | Moler |
| 5,495,536 A | 2/1996 | Osbourn |
| 6,408,109 B1 | 6/2002 | Silver et al. |
| 6,661,907 B2 | 12/2003 | Ho et al. |
| 6,665,439 B1 | 12/2003 | Takahashi |
| 6,690,842 B1 | 2/2004 | Silver et al. |
| 6,775,031 B1 | 8/2004 | Fujiwara |
| 6,862,368 B1 | 3/2005 | He et al. |
| 2003/0098925 A1* | 5/2003 | Orlick ............... H04N 7/012 348/448 |
| 2007/0223817 A1* | 9/2007 | Ulrich et al. ............ 382/199 |
| 2007/0248269 A1* | 10/2007 | Beikirch et al. ......... 382/203 |

FOREIGN PATENT DOCUMENTS

| | | |
|---|---|---|
| JP | 2003-179882 | 6/2003 |
| JP | 2007-257601 | 10/2007 |
| JP | 5868936 | 1/2016 |

OTHER PUBLICATIONS

Huertas, A.; Medioni, G., "Detection of Intensity Changes with Subpixel Accuracy Using Laplacian-Gaussian Masks," Pattern Analysis and Machine Intelligence, IEEE Transactions on , vol. PAMI-8, No. 5, pp. 651,664, Sep. 1986.*

(Continued)

*Primary Examiner* — Fred Hu
(74) *Attorney, Agent, or Firm* — Patent Capital Group

(57) ABSTRACT

An improved algorithm for edge detection is provided that utilizes the second order derivative of the intensity distribution function of an image to provide edge orientation information for the detected edges. An exemplary embodiment of the improved algorithm includes determining the second order derivative of the intensity distribution function, identifying zero-crossings in the horizontal and vertical directions, assigning angle information to the identified zero-crossings in the horizontal and vertical directions; and identifying an edge orientation based the assigned angle information for the horizontal and vertical zero-crossing of the edge and adjacent edges.

20 Claims, 22 Drawing Sheets

(56) References Cited

OTHER PUBLICATIONS

Miura, J.; Kanda, T.; Shirai, Y., "An active vision system for real-time traffic sign recognition," Intelligent Transportation Systems, 2000. Proceedings. 2000 IEEE , vol., No., pp. 52,57, 2000.*
Invitation to Pay Additional Fees and Partial Search Report mailed Jun. 30, 2011 for International Application No. PCT/US2011/028275 (4 pages).
International Search Report and Written Opinion mailed Oct. 25, 2011 for International Application No. PCT/US2011/028275 (14 pages).
Huertas et al., "Detection of Intensity Changes with Subpixel Accuracy Using Laplacian-Gaussian Masks," IEEE Transactions on Pattern Analysis and Machine Intelligence, vol. PAMI-08, No. 5, pp. 651-664 (Sep. 1, 1986).
Longin, "Sliding Window Filters and Edge Detection (Passage)," Retrieved from the Internet: URL:http://www.cis.temple.edu/{latecki/Courses/CIS601-04/Lectures/filtersCh3_04.ppt, jpp. 30-31 (2004).
Szeliski, "Computer Vision: Algorithms and Applications (Passage)," Retrieved from the Internet: URL:http://szeliski.org/Book/drafts/SzeliskiBook_20100903_draft.pdf>, pp. 261-262 (Aug. 18, 2009).
English Translation of Office Action Rejection in Japanese Patent Application Serial No. 2013-500116 mailed Oct. 17, 2014, 2 pages.
Chinese Office Action for CN Application Seiral No. 201180020612.1 mailed Jun. 5, 2015, 14 pages.
Japanese Language Response to Office Action Rejection in Japanese Patent Application Serial No. 2013-500116 filed Jan. 16, 2015, 6 pages.
English Translation of Office Action Rejection in Japanese Patent Application Serial No. 2013-500116 filed Jan. 16, 2015, 4 pages.
Chinese Office Action for CN Application Serial No. 201180020612.1 mailed Sep. 24, 2014, 6 pages.
English Translation of As-Filed Amended Claim Amendments for Response to Chinese Office Action for CN Application Serial No. 201180020612.1 filed Feb. 9, 2015, 3 pages.
Office Action issue in EP Application Serial No. 11710092.5 (based on PCT/US2011/028275) mailed Mar. 20, 2015, 6 pages.
Japanese Office Action issued in JP Patent Application Serial No. 2013-500116 mailed Apr. 24, 2015, 3 pages (Japanese).
English Translation of Japanese Office Action issued in JP Patent Application Serial No. 2013-500116 mailed Apr. 24, 2015, 4 pages.
Notice of Allowance issued in EP Patent Application Serial No. 11710092.5 mailed Jan. 3, 2016.
Notice of Allowance issued in JP Patent Application Serial No. 2013-500116 mailed Dec. 10, 2015, 3 pages.
Notice of Preliminary Rejection issued in Korean Patent Application Serial No. 10-2012-7026762 mailed Aug. 17, 2015, 4 pages.
English Translation of Notice of Preliminary Rejection issued in Korean Patent Application Serial No. 10-2012-7026762 mailed Aug. 17, 2015, 3 pages.
Response to KR Preliminary Rejection filed Feb. 17, 2016, 31 pages. [Includes a Summary of Relevance].
OA3 issued in Chinese Application Serial No. 201180020612.1 mailed Dec. 25, 2015, 15 pages [received via email from FA on Feb. 16, 2016].
Response to OA3 (English Translation of Amended Claims included) issued in Chinese Application Serial No. 201180020612.1 filed Mar. 2, 2016, 51 pages.
Notice of Allowance issued in KR Patent Application Serial No. 10-2012-7026762 mailed Jun. 27, 2016, 2 pages.
English Translation of Allowed Claims re Notice of Allowance issued in KR Patent Application Serial No. 10-2012-7026762 mailed Jun. 27, 2016, 4 pages.
Notice of Allowance issued in CN Patent Application Serial No. 20118002061201 mailed Aug. 30, 2016, 2 pages.
English Translation of Allowed Claims re Notice of Allowance issued in CN Patent Application Serial No. 20118002061201 mailed Aug. 30, 2016, 3 pages.

* cited by examiner

EDGE ORIENTATION FOR SECOND DERIVATIVE EDGE DETECTION METHODS

TECHNICAL FIELD

Embodiments of the invention generally relate to image processing, and more particularly to the detection of edges in two-dimensional images based on changes in the gradient of intensity of the images.

BACKGROUND

Images are commonly thought of as two-dimensional representations of three-dimensional objects. Images may be defined by a two-dimensional grid, where each element of the grid is referred to as a pixel. Associated with each pixel is an intensity. The magnitude of pixel intensity is often expressed in terms of luminance. In a digital image, each pixel may be assigned a luminance value. In an 8-bit image that value would be 0 to 255. Dark pixels have a low intensity, while light pixels have a high intensity. FIG. 1a illustrates an image where the intensity of the image increases along the horizontal axis (from left to right). FIG. 1b is a graph of the intensity distribution of the image along the x-axis. This graph illustrates a change from low (black) to high (white) intensity at approximately pixel 24 (i.e., column 24). Although not shown, an intensity distribution along the y-axis would be a constant.

Edge detection is an important part of image processing. Edge detection involves identifying the lines or boundaries of objects in an image. Thus, referring back to FIG. 1a, image processing devices use edge detection to identify a section along the horizontal line where a low intensity, dark region ends and a high intensity, white region begins.

Presently, one method for identifying edges is to utilize the first order derivative (i.e., the gradient) of the intensity distribution function of an image. Thus, referring to FIG. 2, the edge is at the pixels where there is a significant change (i.e., exceeding a threshold value) in the intensity from low to high. These edges are identified by searching the first order derivative expression for local directional maxima. Edge information obtained from the first order derivative of the intensity distribution function includes both a location and an orientation, also referred to as the angle of the edge.

Relying on the first order derivative to identify edges has several problems. In particular, utilizing the first order derivative tends to produce thick edges. For many reasons, some of which are beyond the scope of this disclosure, thick edges increase the complexity in downstream software which constructs contours (i.e., edge pixels assembled to define a line or curve), and are undesirable when attempting to identify objects in an image. For example, it is extremely difficult and some times impossible to find the center of a thick edge.

One solution is to apply edge-thinning post-processing to the first-order derivative method described above. However, post-processing requires extra hardware, and the images cannot be processed in "real-time," for example, the pixels of the image cannot be processed as the image is captured, for example, by a camera. To use edge-thinning, the entire edge map must be stored and then processed using the edge-thinning techniques.

Another option is to use the second order derivative of the intensity distribution function of the image to identify an edge. The edges are identified by solving the second order derivative expression for the zero-crossing values. Referring to FIG. 3, the zero-crossings demarcate the edges in the image illustrated in FIG. 1 using the second order derivative of the intensity distribution function. One benefit of this method is that using the second order derivative produces a thin edge, in contrast to the use of the first order derivative function. For example, FIG. 2 illustrates an edge stretching approximately from pixels 21 to 29 in the horizontal direction.

One problem with the second order derivative is that the zero-crossings are directionless. In other words, unlike the first order derivative function there is no inherent edge orientation or angle information in the zero-crossing values. One solution is to combine the thin edges identified by the second order derivative with the direction information identified by the first order derivative. This is, of course, not a desirable solution because it requires significant extra processing. And since edge detection is often a pre-processing step when processing an image, additional processing is a drag on system resources. Another option is to further process the second order derivative using complex partial derivatives (e.g., a third order derivative). Again, this is an expensive post-processing step that reduces the practical applications of such an edge detection method. Furthermore, it requires a second post-processing step to finally determine edge orientation based on the direction of intensity change that is the result of taking the partial derivatives.

Accordingly, there is a need for an edge detection system that determines angle and orientation information from a second order derivative of an intensity distribution function without expensive post-processing.

SUMMARY OF THE INVENTION

The present invention and its exemplary embodiments are directed toward an improved method for processing images that utilizes the second order derivative of the intensity distribution function of the image or pixels of the image to identify edges and the orientation of those identified edges. Benefits include thinner edges when the image is reproduced, better ability to segment and recognize objects in the image, and determining edge orientation without twice processing the image. Those of ordinary skill in the art will recognize other benefits and uses of the present invention.

According to one aspect of the present invention, an image processing device is provided that includes an edge detection and classification module that detects an edge and an edge orientation in an image from a change in a gradient of intensity of the image.

According to another aspect of the present invention, a method of detecting an orientation of an edge in a pixel of an image is provided that includes the steps of determining a change in a gradient of intensity of the pixel; determining a change in a gradient of intensity of a plurality of surrounding pixels; separating the change in gradient of intensity of the pixel and the plurality of surrounding pixels into horizontal and vertical components; and determining the orientation of the edge in the pixel based on the horizontal and vertical components of the pixel and the plurality of surrounding pixels.

According to another aspect of the present invention, a traffic information recognition device is provided that includes an edge detection and classification module that detects an edge and an edge orientation in a traffic image based on a change in a gradient of intensity of the traffic image; and a traffic information identification module that identifies traffic information based on detected edge orientation information.

The foregoing and other features and advantages of the present invention will be made more apparent from the description, drawings, and claims that follow. One of ordinary skill in the art, based on this disclosure, would understand that other aspects and advantages of the present invention exist.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 1b is a graph of the intensity distribution of the image illustrated in FIG. 1a.

DETAILED DESCRIPTION OF EXEMPLARY EMBODIMENTS

Described herein are various exemplary embodiments of methods and systems consistent with the invention. These embodiments are exemplary and should not be interpreted to limit the scope one of ordinary skill would give to the invention.

The Algorithm

Figure 1A:
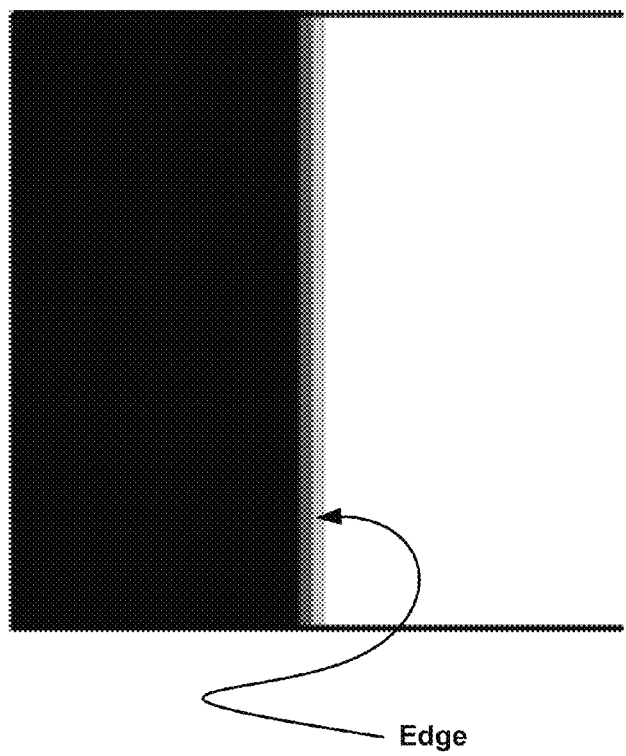
FIG. 1a is an illustration of an edge of an image.
Figure 1B:
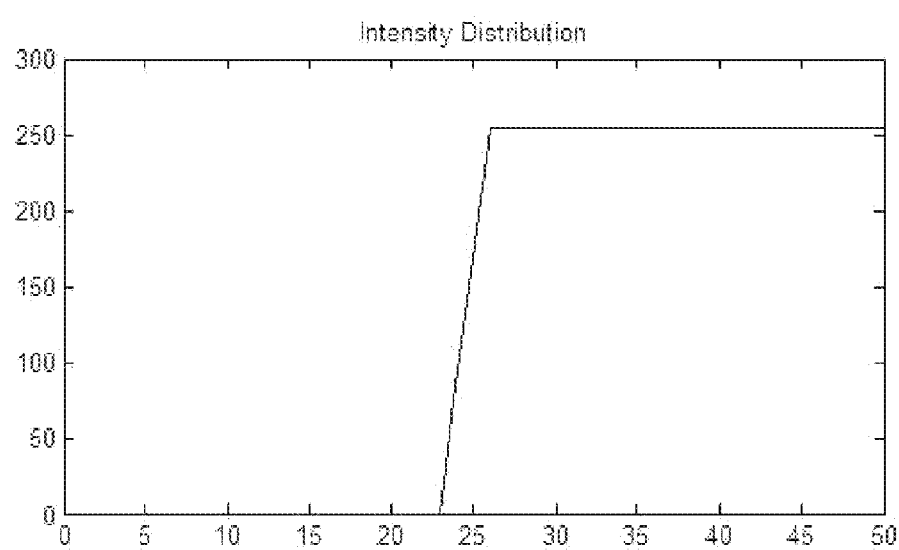
Figure 2:
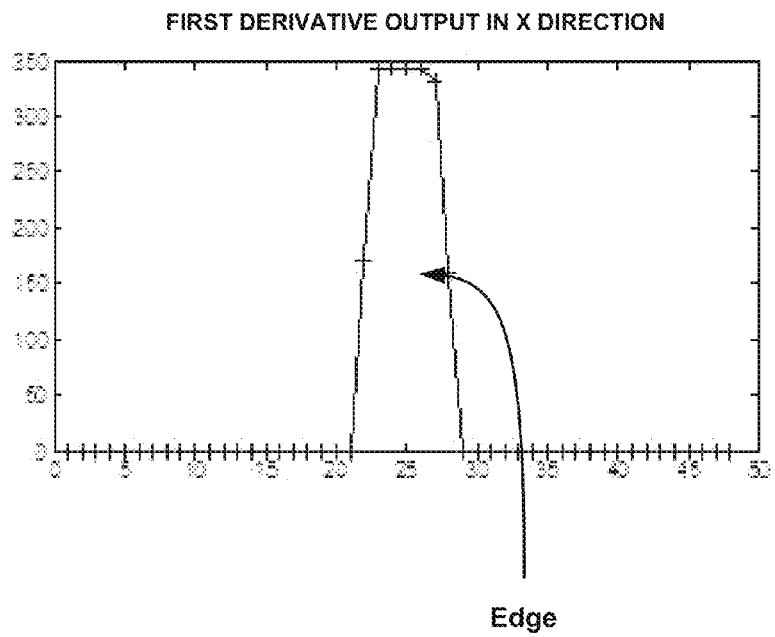
FIG. 2 is a graph of the first derivative output in the x-direction for the intensity distribution illustrated in FIG. 1.
Figure 3:
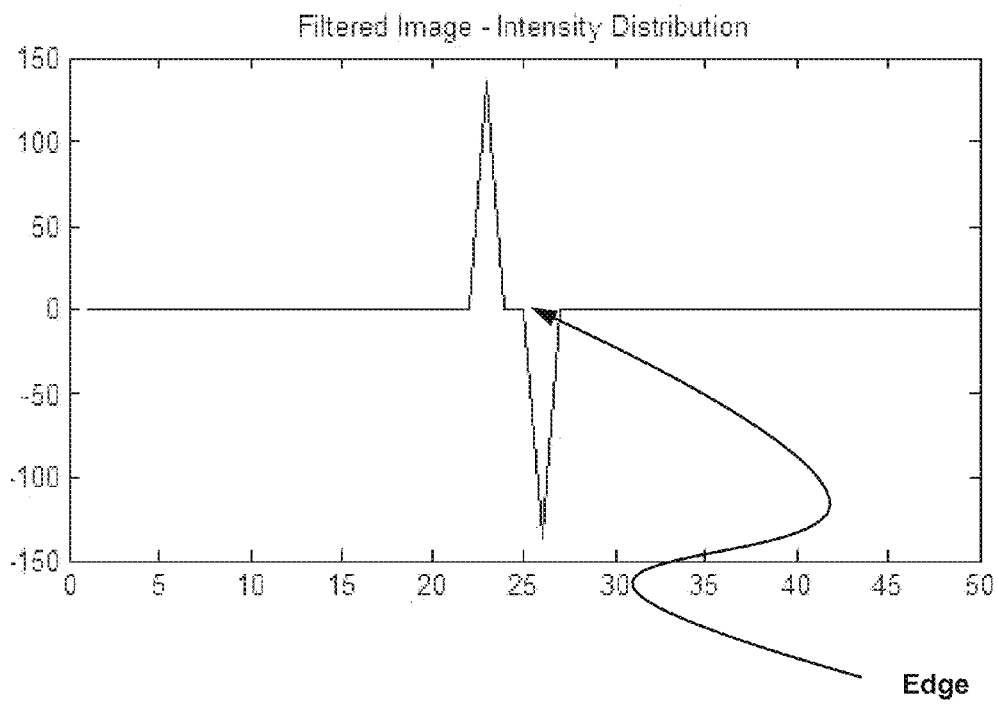
FIG. 3 is a graph of the second derivative output in the x-direction illustrated in FIGS. 1 and 2.
Figure 4:
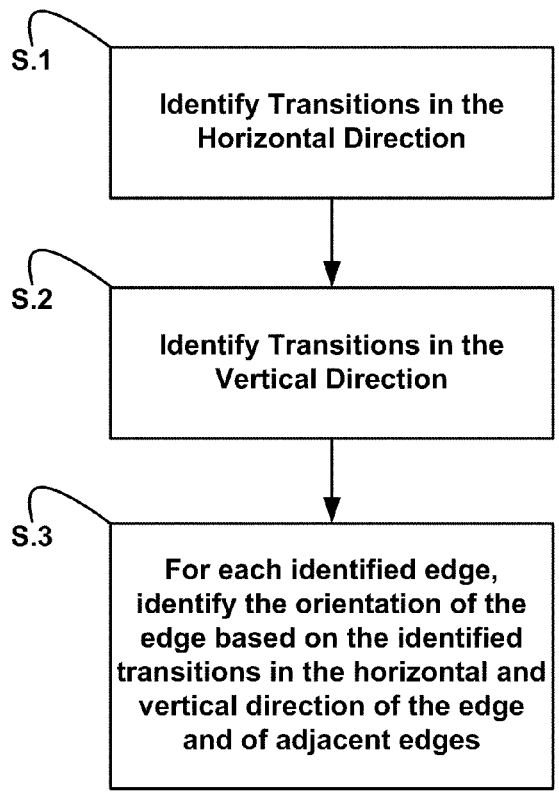
FIG. 4 is a flow chart illustrating an algorithm for determining the orientation of an edge according to an exemplary embodiment of the invention.

An exemplary embodiment of an algorithm for determining edge orientation information from the second order derivative of an intensity distribution function of an image is illustrated in FIG. 4. First, for each identified edge identify transitions (zero-crossings) in the horizontal direction in the intensity distribution, that is, identify low to high transitions and high to low transitions in the direction of the x-axis (S.1). Next, for each identified edge identify transitions (zero-crossings) in the vertical direction in the intensity distribution, that is, identify low to high transitions and high to low transitions in the direction of the y-axis (S.2). For each identified edge, identify the orientation of the edge based on the identified transitions in the horizontal and vertical direction of the edge and of adjacent edges (S.3).

Figure 5:
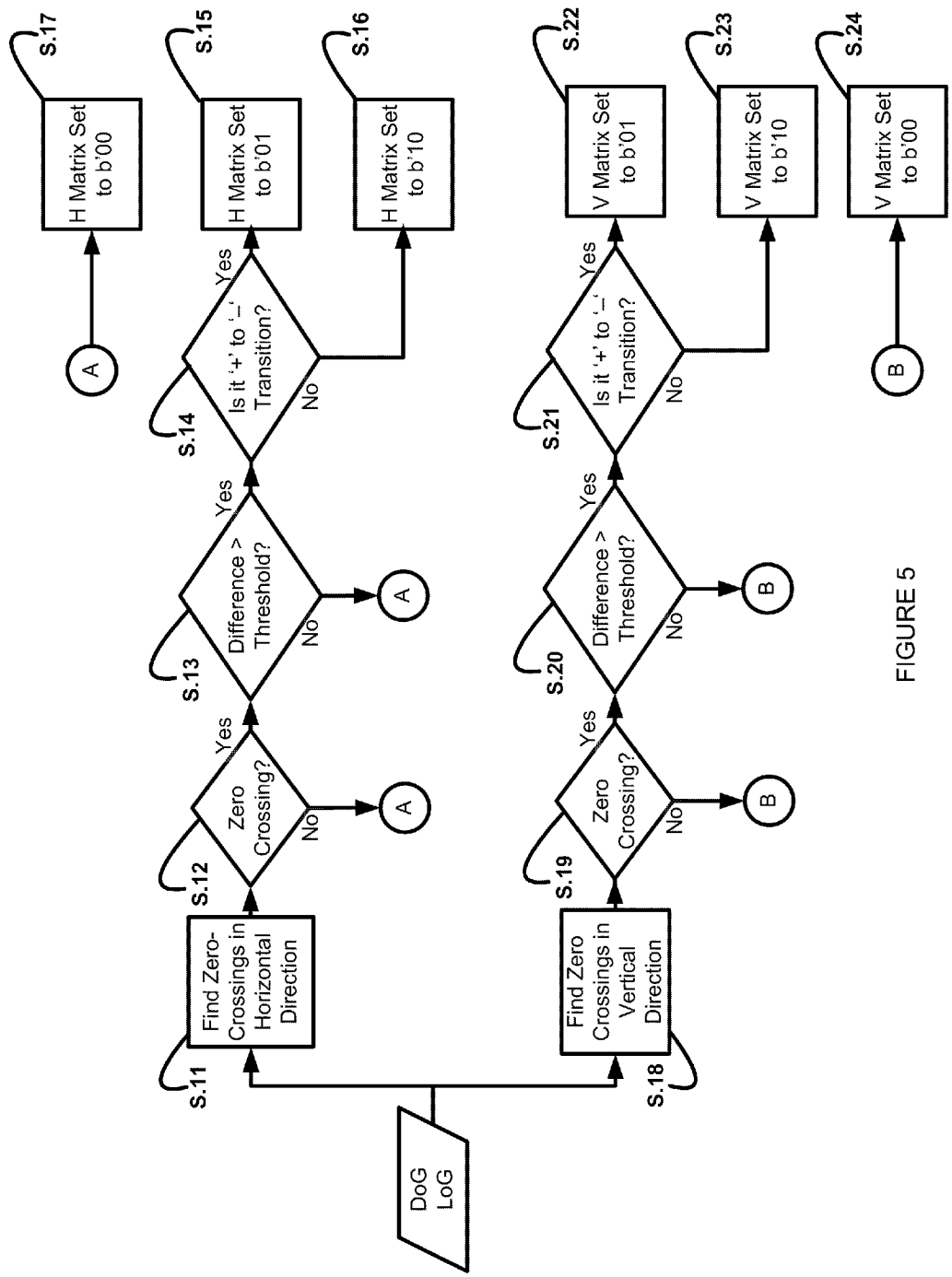
FIG. 5 is a flow chart further illustrating the algorithm for determining the orientation of an edge according to an exemplary embodiment of the invention

FIG. 5 illustrates an exemplary embodiment of the algorithm for identifying vertical and horizontal transitions. FIG. 5 shows a series of processing steps that may be implemented on a processing device or a series of processing devices. This exemplary embodiment operates on a pixel by pixel basis. That is, each pixel is searched for an edge and identified edges are assigned orientation information according to the algorithm described above. In this and other exemplary embodiment references to a "matrix" or "matrices" means data sorted in a logical format that is organized in rows and columns. The data in the matrices need not literally be stored in a 2-dimensional form on a computer readable memory, but rather is stored on the computer readable memory in such a logical format. Matrices lend themselves to image processing because images are 2-dimensional and each pixel in the image may be thought of as positioned at a particular row and column in an m×n matrix.

The output of the second order derivative of the intensity function is the input to the algorithm illustrated in FIG. 5. In this example, either one of two methods are optionally used to determine the second order derivative. The first is Difference of Gaussians (DoG), and the other is Laplacian of Gaussian (LoG).

Beginning with the horizontal gradient, for each pixel the algorithm determines whether there is a zero-crossing in the horizontal direction (S.12). If there is a zero-crossing, the algorithm optionally determines if the change in the intensity meets a threshold in order to eliminate noise (S.13). If the pixel does not include a zero-crossing or the noise threshold is not met, the H-Matrix entry for $Pixel_n$ at row $R_n$ and column $C_n$ is populated with, e.g., the code, '00' (S.17). If, however, the pixel includes a zero-crossing and the noise threshold is met, then if the gradient transition is positive to negative, i.e., '+' to '−' (S.14) the H-Matrix entry for $Pixel_n$ at Row $R_n$ and column $C_n$ is populated with, e.g., a code '01' (S.15), and if the gradient transition is negative to positive, i.e., '−' to '+' (S.14) then the H-Matrix for $Pixel_n$ at Row $R_n$ and column $C_n$ is populated with, e.g., a '01' (S.16).

Turning to the treatment of the vertical gradient in the algorithm illustrated in FIG. 5, the algorithm determines for each pixel whether there is a zero-crossing in the vertical direction (S.19). The algorithm optionally compares the change in the intensity at the zero-crossing to a threshold to determine whether the zero-crossing was caused by noise (S.20). If the pixel does not include a zero-crossing or the noise threshold is not met, the V-Matrix entry corresponding to $Pixel_n$ at row $R_n$ and column $C_n$ is populated with, e.g., the code, '00' (S.24). If, however, the pixel includes a zero-crossing and the threshold is met, then if the gradient transition is positive to negative, i.e., '+' to '−' (S.21) the V-Matrix entry for $Pixel_n$ at row $R_n$ and column $C_n$ is populated with, e.g., a '01' (S.22), and if the gradient transition is negative to positive, i.e., '−' to '+' (S.21) then the V-Matrix entry for $Pixel_n$ at row $R_n$ and column $C_n$ is populated with, e.g., a '01' (S.23).

The input of the respective Horizontal and Vertical segments of the algorithm illustrated in FIG. 5 need not be the same. That is, the Horizontal segment may utilize the second derivative of the intensity distribution along a row of pixels of an image, and searches pixel by pixel of row by row for each zero-crossing in the horizontal direction. The Vertical segment may utilize the second derivative of the intensity distribution along a column of pixels of an image, and search pixel by pixel of column by column for each zero-crossing in the vertical direction. Thus, if the LOG is used to determine the second order derivative, the respective inputs may be the $LOG_H$ (the Laplacian of Gaussians in the horizontal) and $LOG_V$ (Laplacian of Gaussians in the vertical).

Figure 6:
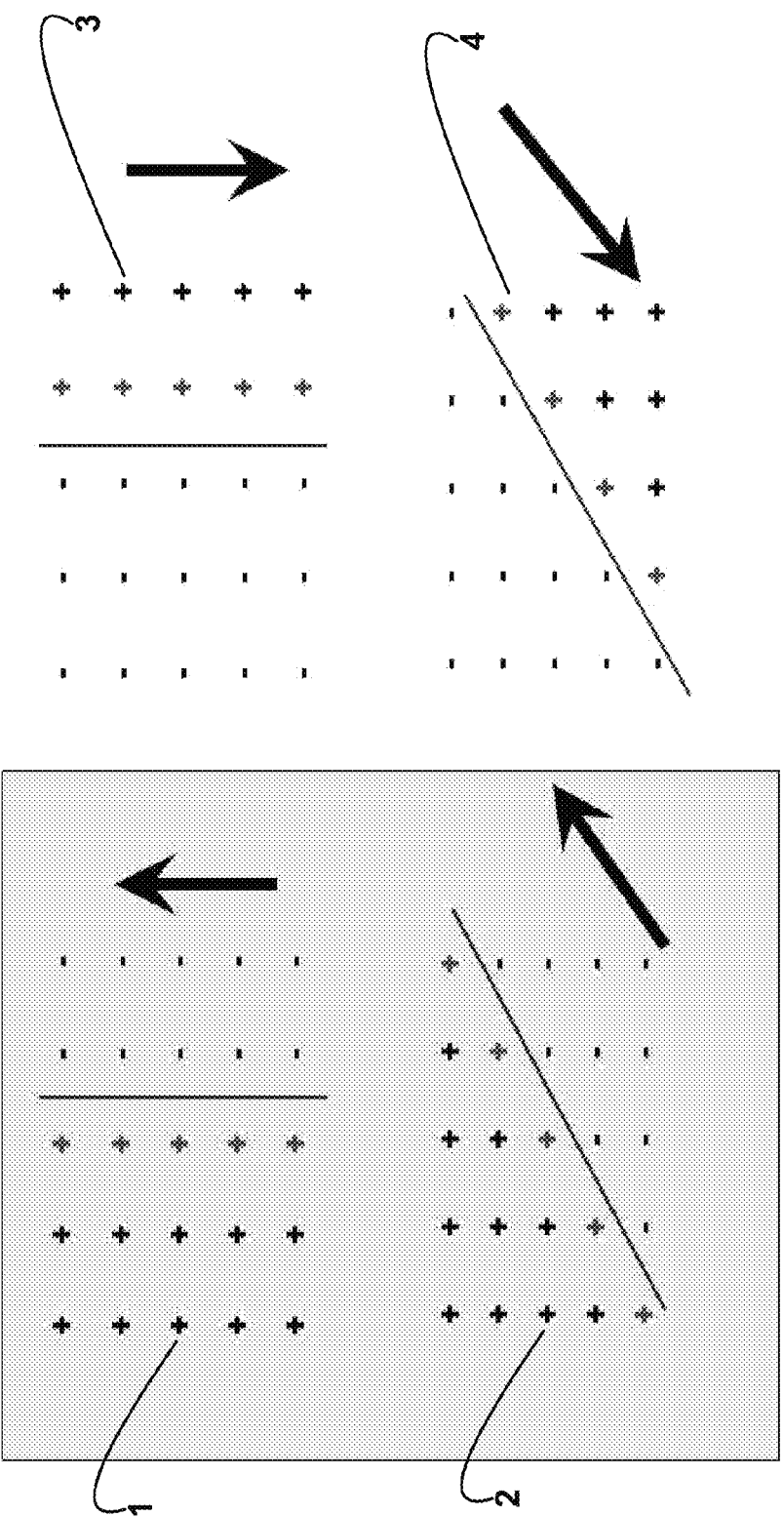
FIG. 6 illustrates the orientation applied to horizontal gradients according to an exemplary embodiment of the invention.

FIG. 6 illustrates the method of identifying intensity transitions in the horizontal direction. The zero-crossings are identified as either a transition from a high to low intensity (i.e., white to black, '−'), or a transition from a low to high intensity (i.e., black to white, '+'). Each type of zero-crossing on the horizontal is associated with an up or down direction, which is a 90° or −90° (270°) angle respectively. Once the direction of the edge across the horizontal gradient is identified, the entry for the pixel in the m×n H-Matrix is populated with a two-bit code according to Table 1:

TABLE 1

| Zero-Crossing | Angle | Direction | Code |
|---|---|---|---|
| +/− | 90° | ↑ | 01 |
| −/+ | −90° (270°) | ↓ | 10 |
| −/− | N/A | N/A | 00 |
| +/+ | N/A | N/A | 00 |

Thus, in FIG. 6, four gradients, 1, 2, 3, and 4, respectively, are illustrated. Gradients 1 and 2 are each a '+' to transition, and the entries for the pixel in the m×n H-matrix are populated with a 90° angle and associated code '01'. Gradients 3 and 4 are each a to '+' transition, and the H-matrix is populated with −90° (or 270°) angle and associated code '10'.

Figure 7:
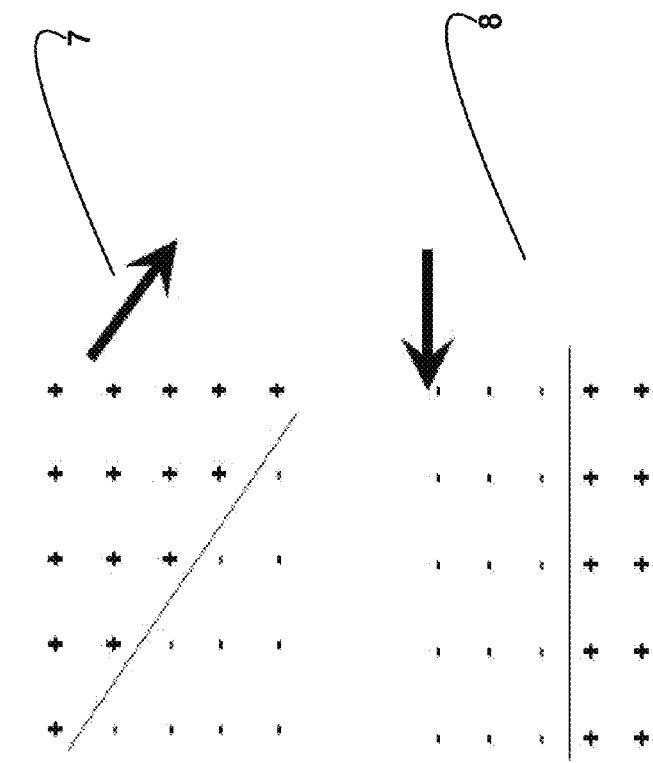
FIG. 7 illustrates the orientation applied to vertical gradients according to an exemplary embodiment of the invention.
Figure 7:
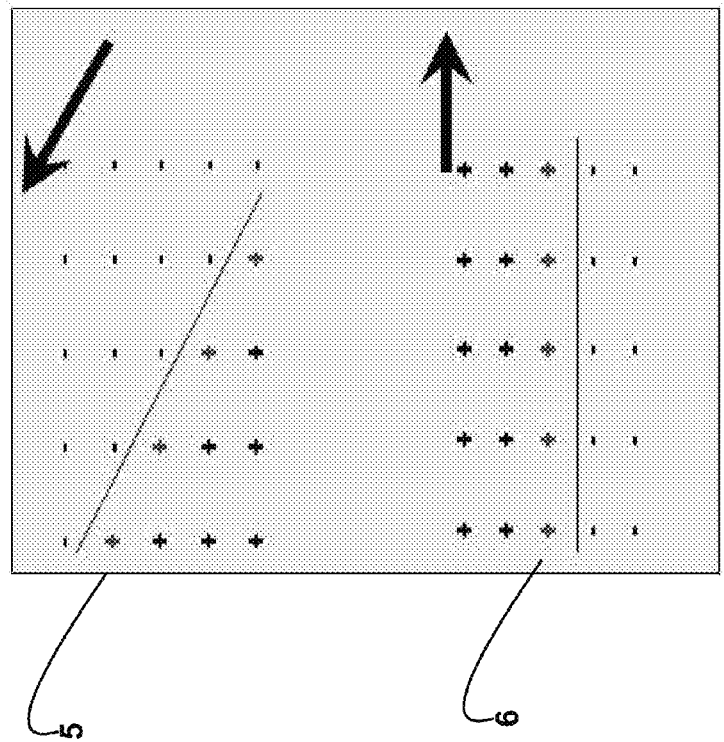

FIG. 7 illustrates the method of identifying intensity transitions in the vertical direction. The zero-crossings are again identified as either a transition from a high to low intensity (i.e., white to black, '−'), or a transition from a low to high intensity (i.e., black to white, '+') in the vertical. Each type of zero-crossing on the vertical is associated with a left or right direction, which is a 180° or −180° (360°) angle respectively. Once the direction of the edge across the vertical gradient is identified, it is populated with a two-bit code according to Table 2:

TABLE 2

| Zero-Crossing | Angle | Direction | Code |
|---|---|---|---|
| +/− | 0° | → | 01 |
| −/+ | 180° | ← | 10 |
| −/− | N/A | N/A | 00 |
| +/+ | N/A | N/A | 00 |

Thus, in FIG. 7, four gradients 5, 6, 7 and 8, respectively, are illustrated. Gradients 6 and 7 are each a '+' to '−' transition, and the pixel entries in the m×n V-matrix is populated with a 0° angle and associated code '01'. Gradients 5 and 8 are each a '−' to '+' transition, and the pixel entries in the m×n V-matrix are populated with a 180° angle and associated code '10".

It should be noted that the directions and codes associated with the particular transitions are merely exemplary, and that one of ordinary skill in the art could select different angles and codes. The only requirement is that a selected orientation based on the types of transitions be applied consistently.

Figure 8:
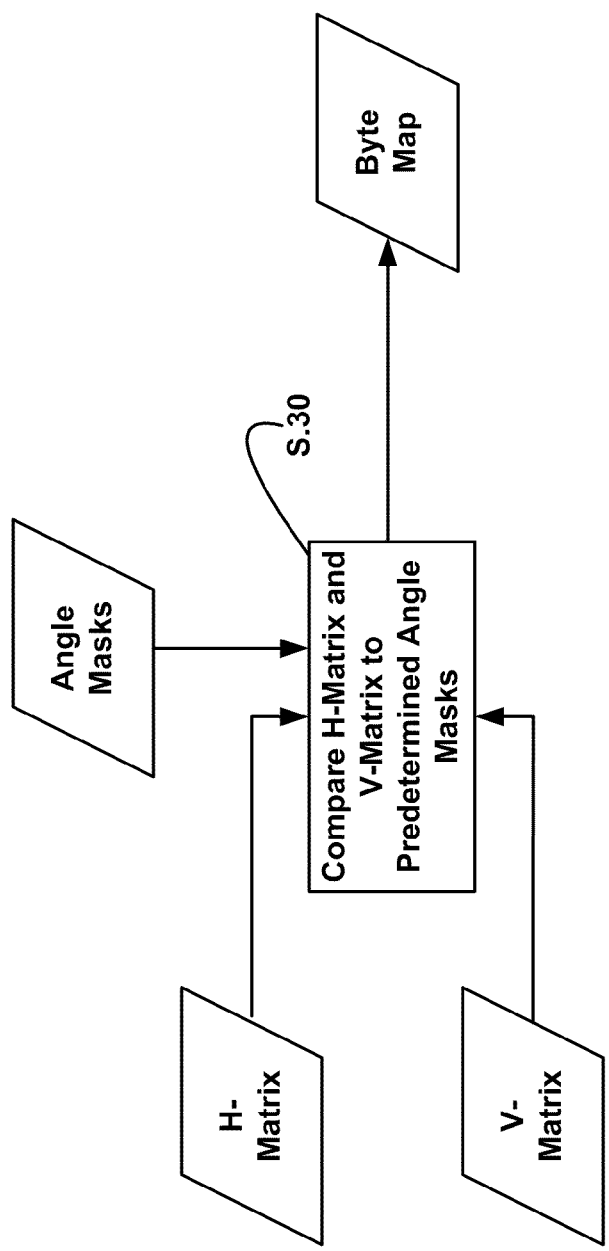
FIG. 8 is a flow chart illustrating an algorithm utilizing angle masks to identify edge orientation according to an exemplary embodiment of the invention.

Turning to FIG. 8, after the H-Matrix and V-Matrix are populated with the horizontal and vertical angle information, and then 3×3 windows of the H-matrix and V-matrix are compared with pre-determined angle mask information to classify the direction of the identified edges (S.30). This particular embodiment of the algorithm uses 3×3 windows because the predetermined angle masks use the horizontal and vertical angle information of an edge in question and of adjacent edges to identify the orientation of the edge in question, but other embodiments may use windows of differing size for better or worse edge orientation estimations (e.g., a larger window to provide a better estimation).

Based on the orientation set-forth in Tables 1 and 2, an angle index is generated for the 3×3 windows from the H-Matrix and V-Matrix and the pre-determined angle mask as set-forth in Table 3:

TABLE 3

| Definition | Angle | Angle Index |
|---|---|---|
| H(r, c) = 00 & V(r, c) = 00 | No Edge | 0000 |
| V(r, c) = 01 & V(r, c + 1) = 01 | 0° | 1000 |
| H(r, c) = 01 & H(r − 1, c) = 01 | 90° | 1010 |
| V(r, c) = 10 & V(r, c − 1) = 10 | 180° | 1100 |
| H(r, c) = 10 & H(r + 1, c) = 10 | 270° (−90°) | 1110 |
| (H(r, c) = 01 ‖ V(r, c) = 01) & (H(r − 1, c + 1) = 01 ‖ V(r − 1, c + 1) = 01) | 45° | 1001 |
| (H(r, c) = 01 ‖ V(r, c) = 10) & (H(r − 1, c − 1) = 01 ‖ V(r − 1, c − 1) = 10) | 135° | 1011 |
| (H(r, c) = 10 ‖ V(r, c) = 10) & (H(r + 1, c − 1) = 10 ‖ V(r + 1, c − 1) = 10) | 225° (−135°) | 1101 |
| (H(r, c) = 10 ‖ V(r, c) = 01) & (H(r + 1, c + 1) = 10 ‖ V(r + 1, c + 1) = 01) | 315° (−45°) | 1111 |
| — | No Match | 0001 |
| — | Multiple Match | 0010 |

Each angle index is associated with the edge direction set forth in the first column of Table 3. As an explanation of Table 3, if an examined edge meets the condition set forth in the 'Definition' column, then the particular edge is orientated at the angle set forth in the 'Angle' column, and is assigned the angle index in the 'Angle Index' column. One benefit of the orientations defined in Table 3, is that they follow the contour of the shape formed by the edges, and there are no artifacts in, for example, corners of squares, rectangles etc.

Figure 9:
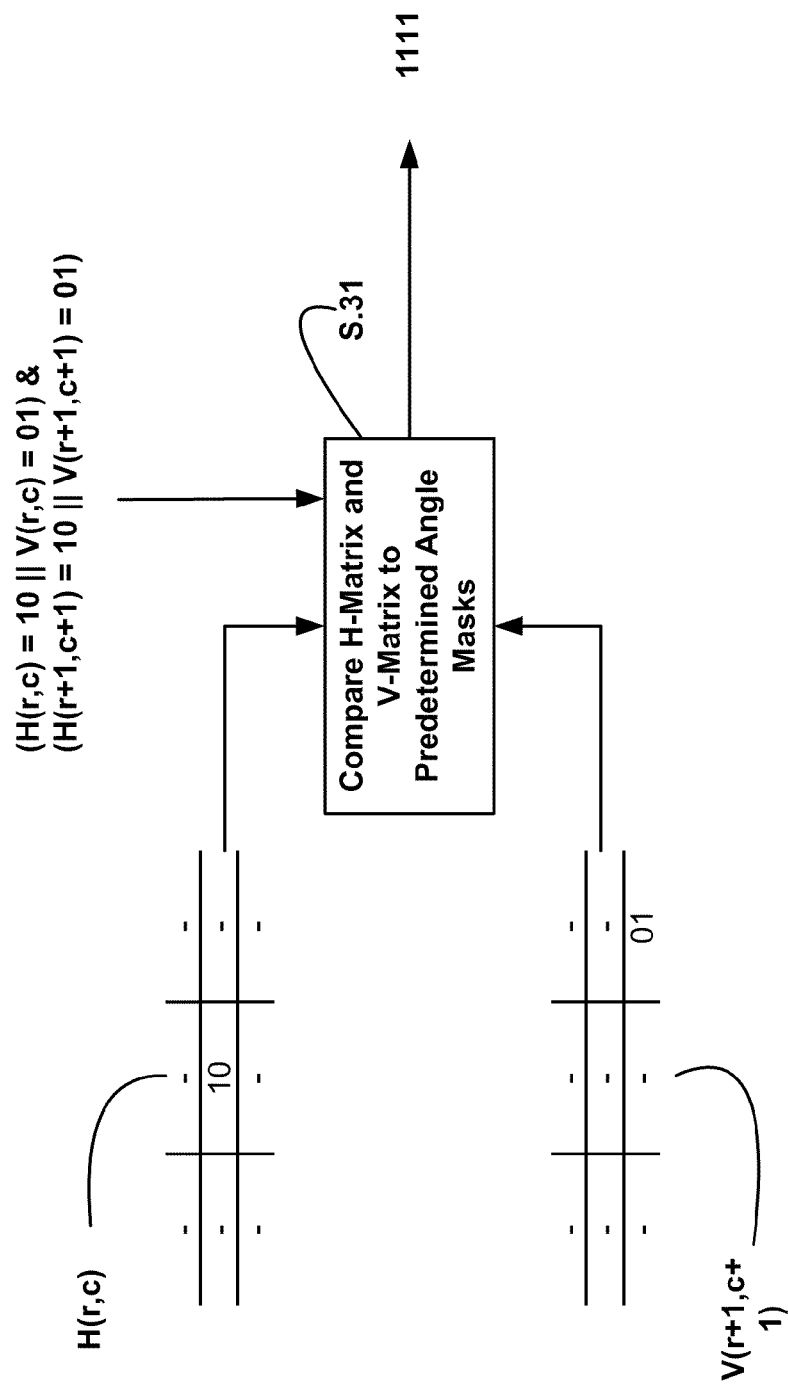
FIG. 9 is an illustration of an exemplary operation of the algorithm illustrated in FIG. 8.

FIG. 9 illustrates two 3×3 matrices, an H-Matrix and a V-Matrix. In these drawings, only the matrix entries relevant to the example are illustrated. The center entry 'r, c' of each 3×3 window corresponds to the pixel 'r, c' having the edge for which orientation is being determined. In this example, the code at H(r, c) is '01' and the code at V(r+1, c+1) is '01.' This corresponds to the 315° angle and the Angle Index '1111.' Thus, if this particular edge is at pixel row R=1 and column C=2 and is oriented at a 315° angle (see column two of Table 3), then it should be connected to the edge found at the pixel at row R=2 and column C=3 (i.e., in the 315° direction). This process is repeated for every entry in the H-Matrix and the V-Matrix.

A final m×n matrix (i.e., 'm' Pixels by 'n' Pixels) that is the angle index for the image is populated with the edge orientation information. One benefit of this algorithm is that the final m×n angle index matrix consists of both edge identification and orientation information. Only entries having edges will have edge orientation information, and every edge will have an orientation. Thus, the algorithm both identifies the edges and the edge orientation information based on the second order derivative of the intensity distribution function of the processed image.

Each of the H-Matrix, V-Matrix, angle index matrix, and the information of Tables 1-3 may be stored on computer readable memory (not shown) accessible for use in the processing described above.

Object Segmentation and Identification

Figure 10A:
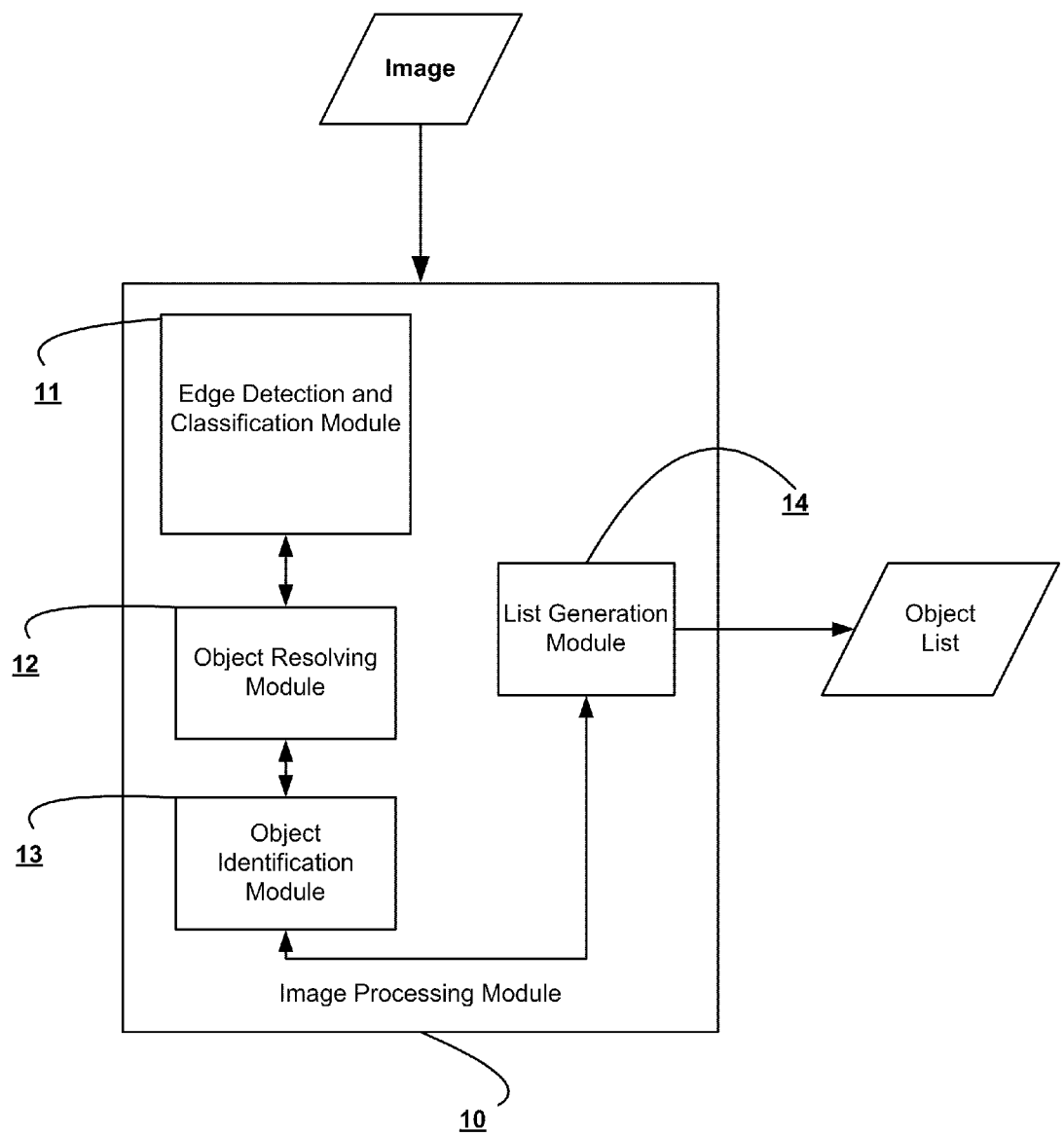
FIG. 10a illustrates an image processing module according to an exemplary embodiment of the invention.
Figure 10B:
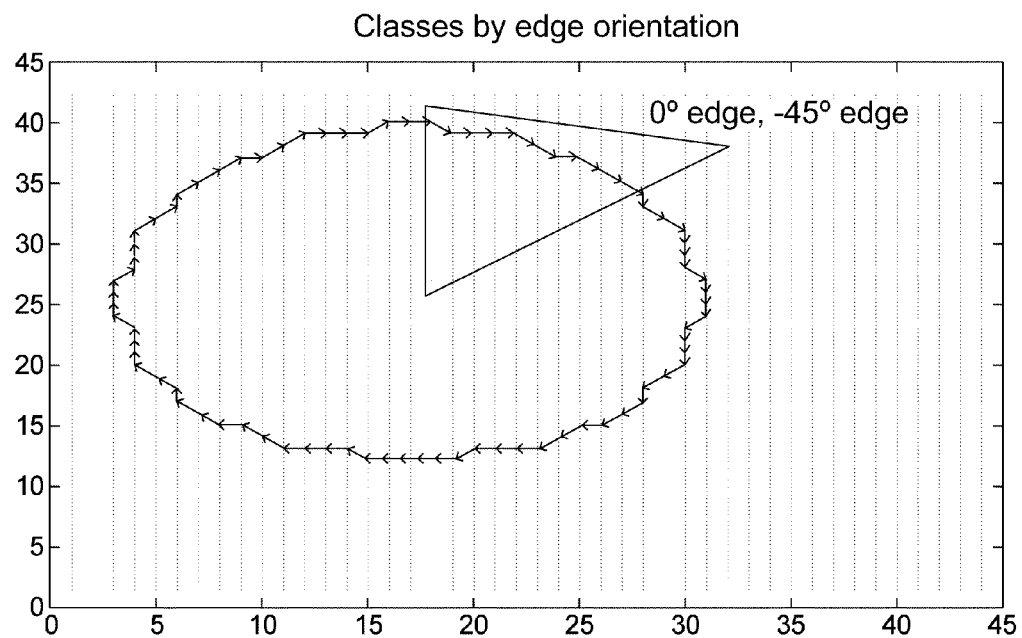
FIG. 10b is an illustration of a contour map used to identify a shape according to an exemplary embodiment of the invention.

FIGS. 10a-12 illustrate another exemplary embodiment of the present invention. In this exemplary embodiment, the algorithm described above for edge detection including direction information is utilized as part of a system for segmenting and identifying objects in an image. FIG. 10a illustrates an Image Processing Module 10 according to this exemplary embodiment of the present invention. The Image Processing Module 10 includes an Edge Detection and Classification Module 11, an Object Resolving Module 12, an Object Identification Module 13, and a List Generation Module 14.

Figure 10C:
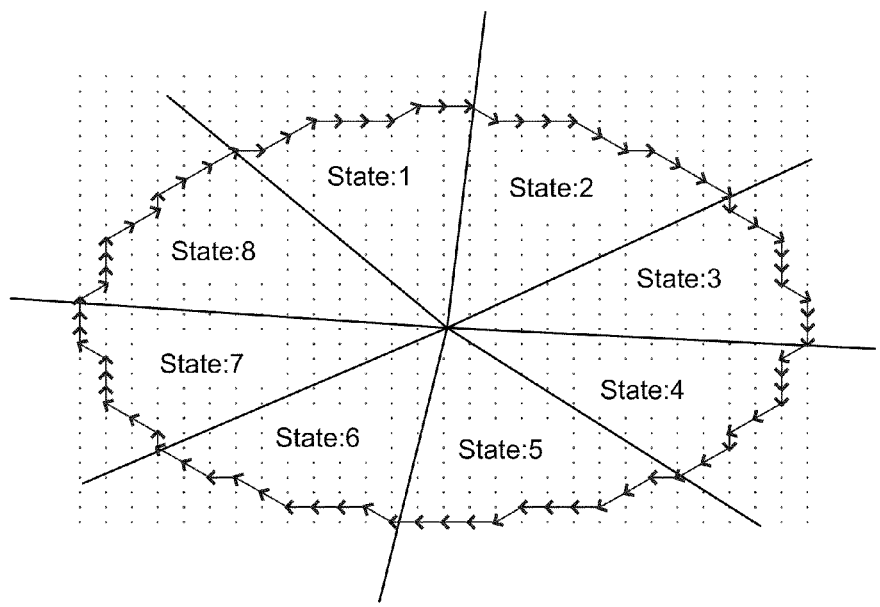
FIG. 10c is an illustration of the contour map of FIG. 10b classified according to 'states' of the edge orientations in the contour map.
Figure 11:
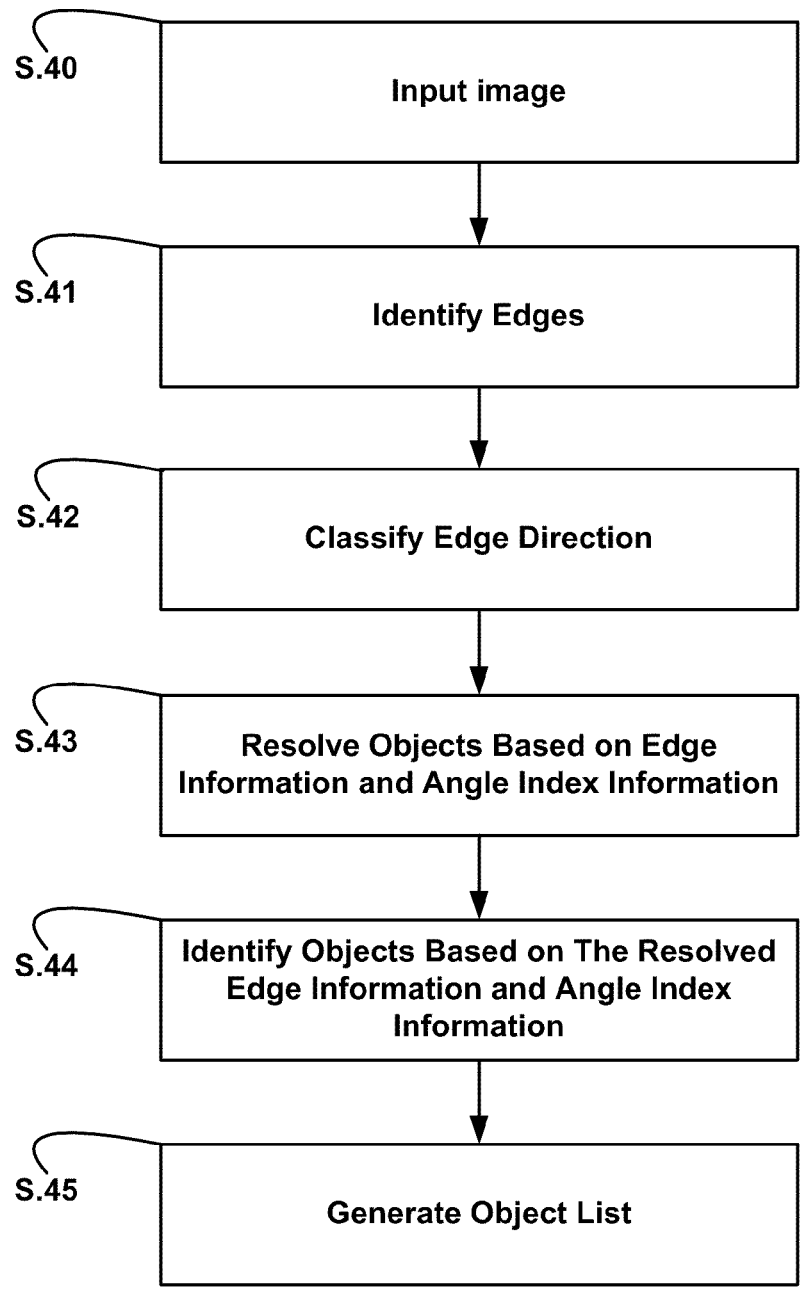
FIG. 11 is a flow chart illustrating an exemplary operation of the image processing module illustrated in FIG. 10.

FIG. 11 illustrates an exemplary operation of the Image Processing Module 10 with reference to FIG. 10. First, the Image Processing Module 10 inputs the image (S.40). The image may be without limitation a .tif, .jpeg, .pdf, .bmp, .gif, .raw, .ppm, .svg, or another format. The Edge Detection and Classification Module 11 processes the image and utilizing the algorithm described with regard to FIGS. 4-9 identifies the edges from the second order derivative of the intensity function (S.41), and, classifies the edge orientations (S.42). The Object Resolving Module 12 takes as input the angle index matrix and either groups or separates the edge orientation information according to the objects in the image (S.43). The Object Identification Module 13 takes as input the resolved edge orientation information and based on the distribution of edges orientations identifies the different objects in the image (S.44).

According to one exemplary embodiment, the Object Identification Module 13 may identify objects using such methods as Histogram of Orientated Gradient (HOG), edge orientation histograms, scale-invariant feature transform descriptors, and shape contexts. HOG in particular achieves superior results when the edges are thin and the edge orientation is precise. Thus, HOG will achieve especially superior results according to the method of determining edge orientation described herein which utilizes the second-order derivative. Indeed, because the edges and orientation are determined at the same time and those edges are thinner, HOG is useable in real-time. This is not the case according to first order derivative methods of edge detection and edge orientation.

Alternatively, for known objects with well defined characteristics (e.g., circles, rectangles, squares, triangles, hexagons, etc), the Object Identification Module 13 may use the pattern of changes in orientation to identify the resolved objects. For example, the resolved circle illustrated in FIG. 10b has the following changes in Table 4:

TABLE 4

| Change in Orientation |
| --- |
| 45° edge, 0° edge |
| 0° edge, −45° edge |
| −45° edge, −90° edge |
| −90° edge, −135° edge |
| −135° edge, 180° edge |
| 180° edge, 135° edge |
| 135° edge, 90° edge |
| 90° edge, 45° edge |

Each of these eight changes in orientation may be thought of as the beginning and end of eight distinct states, illustrated in FIG. 10c. Each state is the same length, and each state has symmetry in the opposite direction, thus, the Object Identification Module 13 extrapolates that this could be a circle. Then, using other geometric properties of a circle, such as a circle has the same radius (or close to the same) in all 360°, the Object identification Module 13 identifies the object as a circle. One benefit of using this state method is that it will connect broken edges as well as eliminate small deviations in the shape.

Alternatively, the Object Identification Module 13 may include a memory (not shown) having stored thereon images of known objects. In this alternative exemplary embodiment the contour maps of known objects are scaled to the size of the object in the image (e.g., in the case of a circle, according to the diameters, or in the case of another shape the perimeter, etc.) and a compare correlation is performed of the determined edge orientations to the known object's contour map. If the contour map of the object in the image matches the scaled contour map of the known object, then the object in the image may be identified as the known object.

It should be noted that exact matches to the geometric properties of a shape may not always occur and some shape identification techniques may be unnecessarily computationally intensive. Thus, exemplary embodiments of the present invention may utilize confidence factors to determine if the identified characteristics are close enough to the known characteristics of objects to positively identify the object in the image. According to one exemplary embodiment, if the confidence does not meet a threshold, the Object Identification Module 13 will use a more precise method of identifying the object, such as HOG. Further, the Object Identification Module 13 may assign precedence to the different methods of identifying objects and attempt identification according to each method until the results satisfy the confidence level. Such confidence levels may be provided automatically, or provided by a user.

The List Generation Module 14 generates an Object List to output from the Imaging Processing Module 10 (S.45). The Object List may include without limitation a list of objects or a contour map of the image. In one exemplary embodiment, the Object List may include additional positioning information for the listed objects, useful for post-processing activity.

Figure 12:
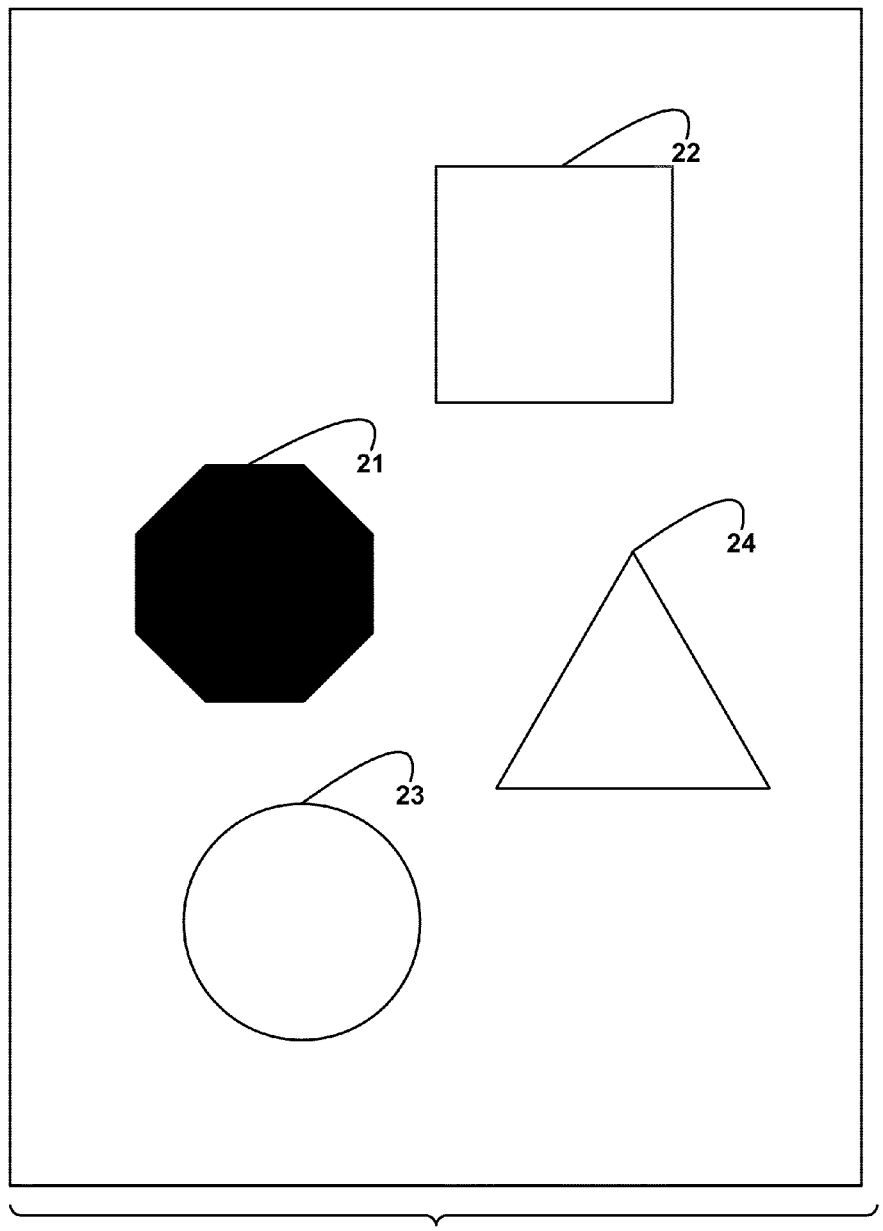
FIG. 12 is an image of objects identifiable by the image processing module illustrated in FIGS. 10 and 11.

FIG. 12 illustrates an Image 20 with objects Octagon 21, Square 22, Circle 23 and Triangle 24. The Octagon 21 has a contrast in luminance from its background because the area contained within the Octagon 21 is black and its edges are defined by a change of intensity from the low intensity black to the high intensity white. The entire Image 20 is input to the Image Processing Module 10, and for each pixel of the image, the Edge Detection and Classification Module 11 generates the angle index matrix organized in an m×n matrix or in a series of m×n matrices.

Figure 13:
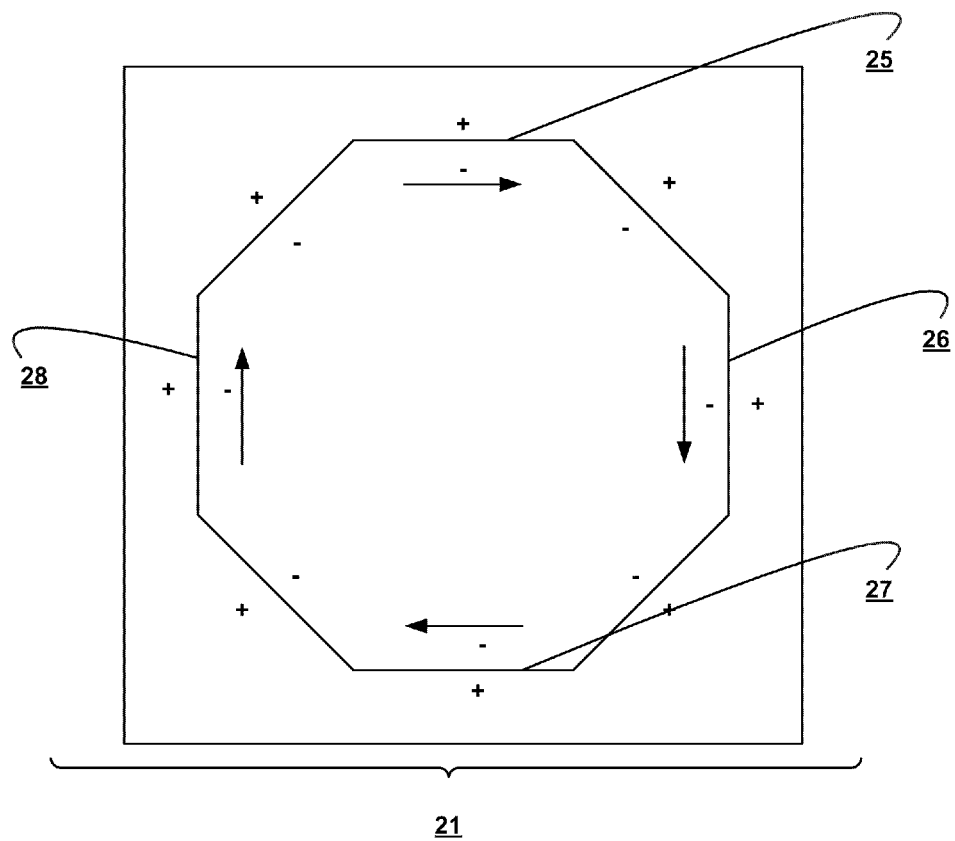
FIG. 13 is an illustration of the gradients and contour map for one of the objects in the image of FIG. 12.

The Object Resolving Module 12 accepts that m×n matrix of angle index information and resolves the various detected edges and associated angles into groups related to distinct objects for identification, i.e., the four shapes. Thus, turning to FIG. 13, for the Octagon 21, four Edges, 25, 26, 27 and 28 are illustrated. For Edge 25, the Edge Detection and Classification Module 11 uses the second order derivative of the intensity function of the pixels along Edge 25-28 to identify the edges and to generate angle index information for each edge in the pixels forming the longer Edge 25. For each of the edges in the pixels forming Edge 25 there is no zero-crossing over the horizontal gradient, so the H-Matrix entry for Pixel(r,c) is populated with the code '00'. For the vertical gradient, the transition of a white '+' to a black '−', is associated with a 0° direction, so the V-Matrix entry for Pixel(r, c) is populated with the code '01'. Thus, because V(r, c)='01' and V(r, c+1)='01' the angle index matrix entry for Pixel(r, c) is populated with '1000', which corresponds to 0°. This indicates that the edge at Pixel(r, c) should be connected to the edge in Pixel (r, c+1), or in other words, the edge in the pixel in the 0° direction.

For Edge 26, the output of the second order derivative is input to the Edge Detection and Classification Module 11, which uses the algorithms described above with regard to FIGS. 5-9 to generate angle index information for each pixel forming Edge 26. For each of the pixels forming Edge 26, there is no zero-crossing over the vertical gradient, so the V-Matrix entry for Pixel (r, c) is populated with the code '00'. For the horizontal gradient, the transition of white to black '+' is associated with −90°, so the H-Matrix entry for Pixel(r, c) is populated with code '10'. Thus, because H(r,c)='10' and H(r+1,c)='10' the angle index matrix entry for Pixel(r,c) is populated with the code '1110', which corresponds to −90°. This indicates that Pixel(r, c) should be connected to the edge in Pixel(r+1, c), or in other words, the edge in the pixel in the −90° direction.

For Edges 27 and 28, the transitions are the opposite of the Edges 25 and 26, respectively, and thus the direction information is also the opposite, i.e., 180° and 90°, respectively. Thus, the angle index populated with respect to Edges 27 and 28 are '1100' and '1010', respectively. Since Octagon 21 has eight sides there are additional angles associated with the other four edges, but the determination of that edge orientation information is omitted for simplicity of this example.

After the edges and edge orientations are classified for all of the edges in Image 20, the Object Resolving Module 12 resolves the information into different groups according to the angle index information. Thus, the angle index information is resolved into groups corresponding to the Octagon 21, Square 22, Circle 23 and Triangle 24.

For each resolved group of angle index information, the Object Identification Module 13 identifies the particular object. Thus, the Object Identification Module 13 identifies the Octagon 21 as an "Octagon" from the distribution of angles associated with the detected edges depicted in FIG. 13. Finally, the List Generation Module 15 outputs a list of the objects identified in the Image 20. In particular, the list is comprised of the Octagon 21, Square 22, Circle 23 and Triangle 24.

Although this illustration included an octagon, square, circle and triangle, those are not the only shapes that the Image Processing Device 10 is capable of identifying. Using the distribution of angles of each object in an image, the Image Processing Device 10 is also capable of identifying other shapes, letters, numbers, symbols, and more.

Traffic Sign Identification

Figure 14:
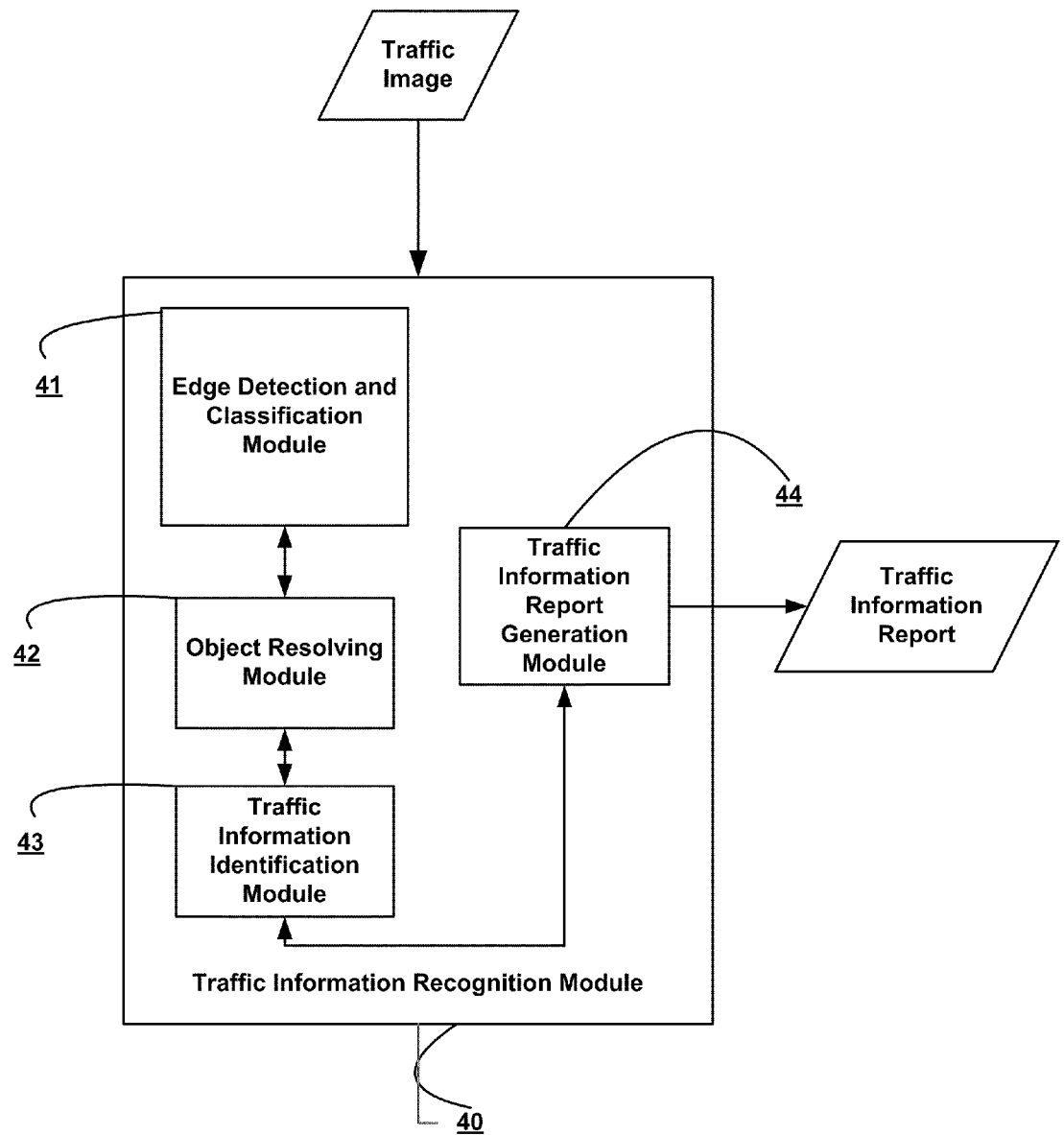
FIG. 14 depicts a Traffic Information Recognition Module utilizing the edge orientation algorithm according to an exemplary embodiment of the invention.

FIGS. 14 through 17 illustrate another exemplary embodiment of the present invention. FIG. 14 is a Traffic Information Recognition Module 40 according to an exemplary embodiment of the present invention. The Traffic Information Recognition Module 40 includes an Edge Detection and Classification Module 41, Object Resolving Module 42, Traffic Information Identification Module 43, and a Traffic Information Report Generation Module 44.

The Traffic Information Recognition Module 40 may be incorporated entirely into a vehicle, such as a passenger vehicle or a mass transportation vehicle such as a bus. Alternatively, the Traffic Information Recognition Module 40 may be remotely situated, for example at a traffic monitoring station, where it receives traffic images transmitted by radio, satellite, or over communication lines, such as the telephone lines, fiber optic cable, or other long-haul data carriers.

Figure 15:
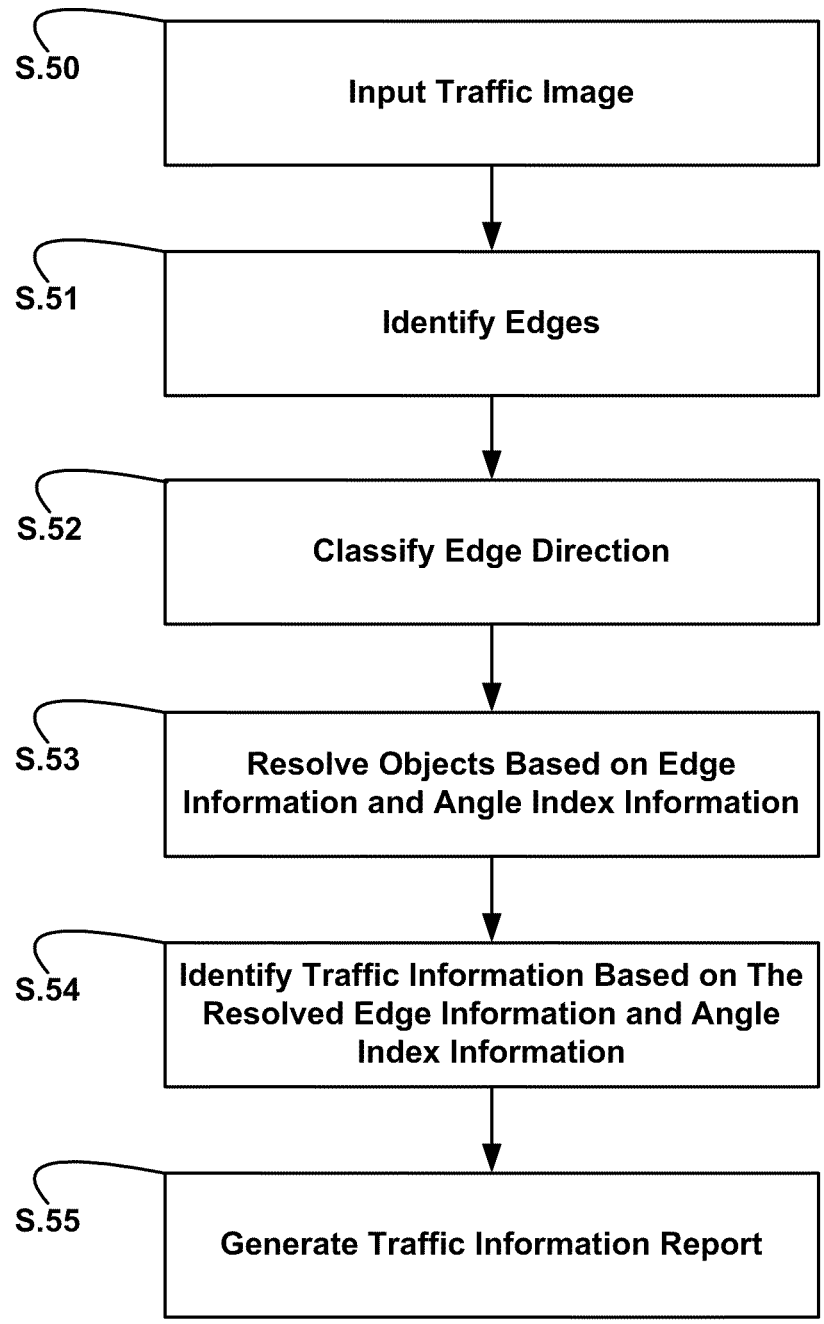
FIG. 15 is a flow chart illustrating an exemplary operation of the Traffic Information Recognition Module illustrated in FIG. 14.

FIG. 15 illustrates an exemplary operation of the Traffic Information Recognition Module 40. First, a traffic image is input to the Traffic Information Recognition Module 40 (S.50). The traffic image may be without limitation a digital picture. The traffic image may be without limitation a .tif, .jpeg, .pdf, .bmp, .gif, .raw, .ppm, .svg, or another format. For each pixel in the traffic image, the Edge Detection and Classification Module 41 utilizes the second order derivative of the intensity function to identify edges in the image (S.51), and edge orientation information (in the form of an angle index information) for each edge (S.52). Next, the angle index information from the Edge Detection and Classification Module 41 is input to the Object Resolution Module 42 to resolve the information into groups corresponding to separate objects in the traffic image (S.53). Next, the Traffic Information Identification Module 43 utilizes the resolved edge and angle index information to identify the objects in the image (S.54). Finally, the Traffic Information Report Generation Module 44 generates a Traffic Information Report (S.55). The Traffic Information Report may be without limitation a text file, a word processing document, an image, an image with text information embedded in the metadata, a database file, combinations thereof, or a more robust data file, depending on the needs of the user.

The identified traffic information may include without limitation traffic sign types, speed limit information, emergency information, priority information, special regulation information, direction information, route markers, road and route identification information, attraction information, commercial information (e.g., names of nearby commercial and retail centers), and geographic information.

Figure 16:
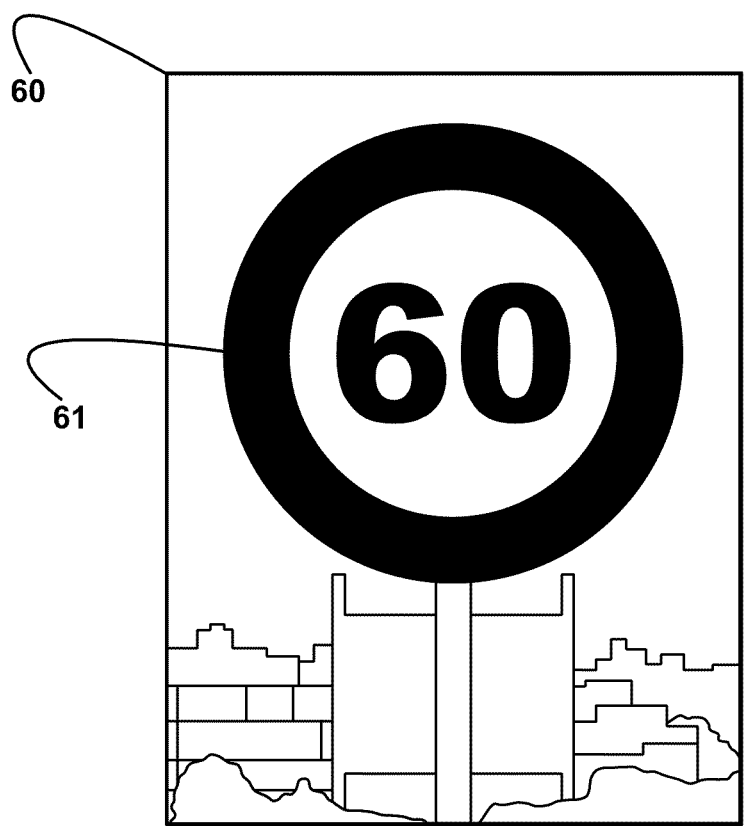
FIG. 16 is a traffic image processable by the Traffic Information Recognition Module illustrated in FIGS. 14 and 15.
Figure 17:
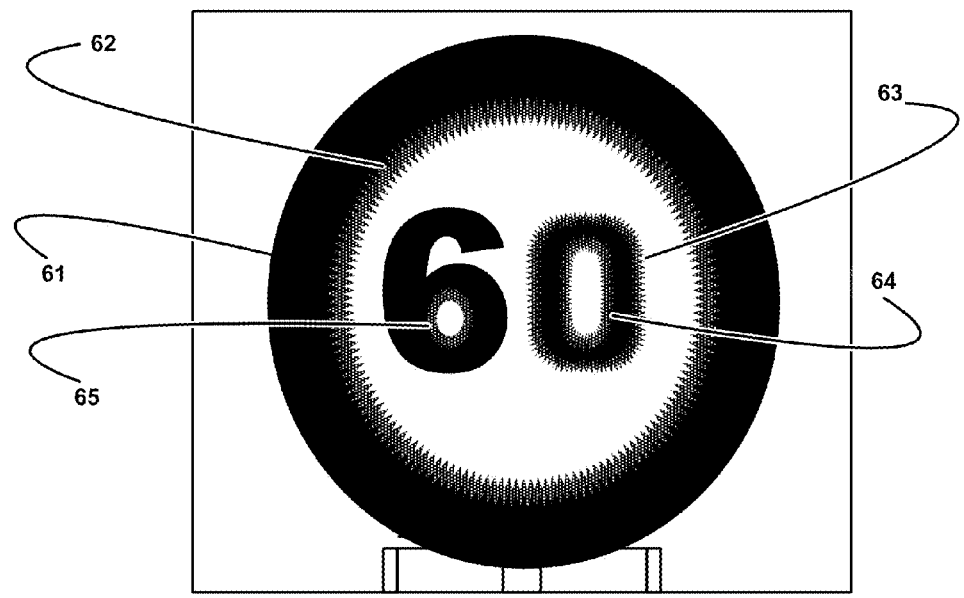
FIG. 17 is an illustration of the various objects on the image of the traffic sign illustrated in FIG. 16 recognized by the Traffic Information Recognition Module illustrated in FIGS. 14 and 15.

FIG. 16 illustrates a Traffic Image 60 including a Traffic Sign 61, processable by the Traffic Information Recognition Module 40. The Traffic Sign 61 is substantially circular shaped. Painted on the Traffic Sign 61 is another circle, and within the circle, the numbers '6' and '0' (e.g., 60 km/h). Each of these shapes is resolvable and recognizable by the Traffic Information Recognition Module 40, and is illustrated in FIG. 17. Here, the Traffic Information Recognition Module 40 identifies four objects, 62, 63, 64 and 65 according to the method illustrated in FIG. 15.

Figure 18:
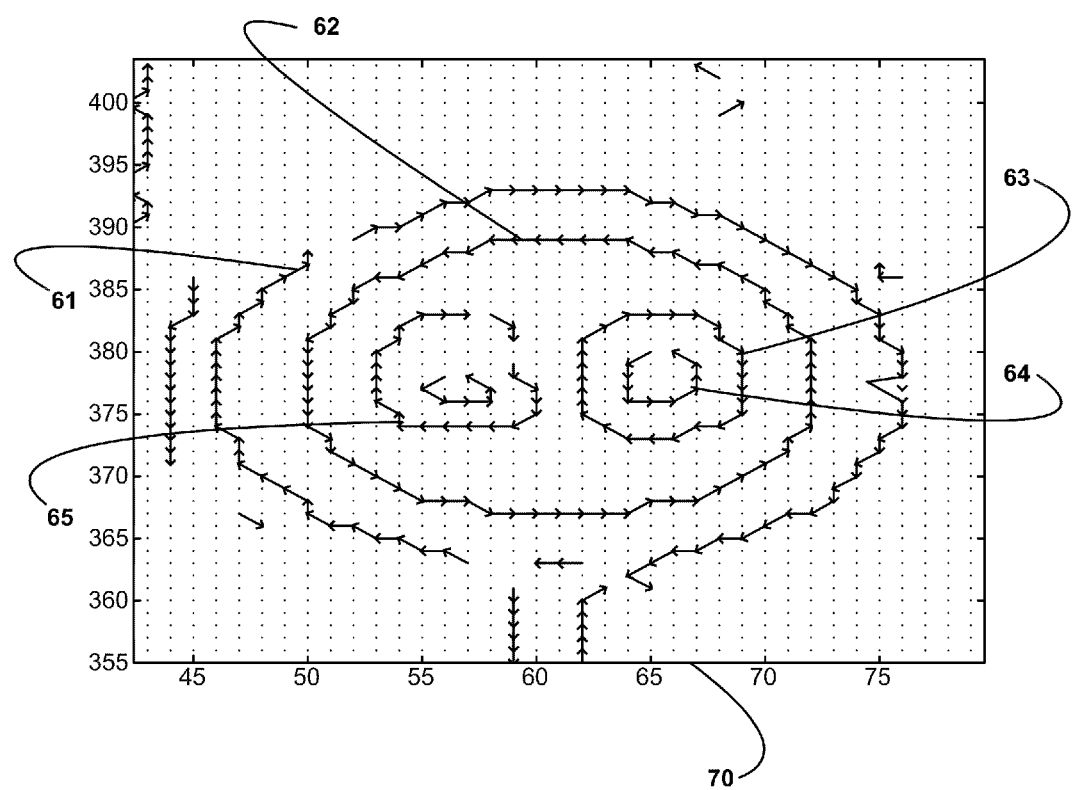
FIG. 18 is an illustration of a contour map that illustrates edge orientations identified from the traffic sign image illustrated in FIG. 16.

FIG. 18 is a Contour Map 70 illustrating the derived edge orientations for the objects identified in the Traffic Sign 61. As can be seen, the Contour Map 70 includes the angle index information for the identified four objects, 62, 63, 64 and 65.

The Object 61 is the shape of the Traffic Sign 61, a circle. Using the various shape identification methods described above (HOG, the state method, etc) the Traffic information Identification Module 43 identifies the circle shape of the Object 61, and recognizes this as a speed limit sign. After identifying Object 21 as a speed sign, the Traffic information Identification Module 43 implements protocols for speed signs and identifies those objects on the speed sign, including the numbers which correspond to Objects 63-65. The objects on the speed sign may be identified using the methods described above (HOG, the state method, etc). Those methods are not limited to simple objects, but may be used to identify numbers, letters and figures as well. They may also be used in conjunction with other methods to increase the confidence of identification.

Different regions of the world use different standard shapes for street signs. For example, in India and Europe speed limits are displayed on circular shaped signs, but in the United States are displayed on rectangular shaped signs. Exemplary embodiments of the invention may use databases storing the distributions of edge orientations or known sign information for matching street signs according to particular regions of the world. In one embodiment, the Traffic Information Recognition Module 40 communicates with a global positioning device or other location identification device in order to determine the location of a vehicle having installed the Traffic Information Recognition Module 40. The global positioning device or other location identification device provides the Traffic Information Recognition Module 40 with the geographic region in which the vehicle is traveling so that the Traffic Information Recognition Module 40 may load the geographically appropriate edge orientation distribution information. In another embodiment the Traffic information Recognition Module 40 is region specific, and only includes the distributions of edge orientations, or known sign information for a specific region. In another embodiment, the Traffic Information Recognition Module 40 is remote from the vehicle, for example, at a traffic management center. In this exemplary embodiment the Traffic Information Recognition Module 40 may receive location information embedded in the image or in the signal transmitting the image. One of ordinary skill in the art would recognize alternatives for collecting and storing the location information.

While this exemplary embodiment described processing traffic images to identify traffic signs, the present invention is not so limited. It could also be used without limitation to identify markers on streets (e.g., lane lines or cross-walks), pedestrians, or other vehicles.

Text Recognition

Figure 19:
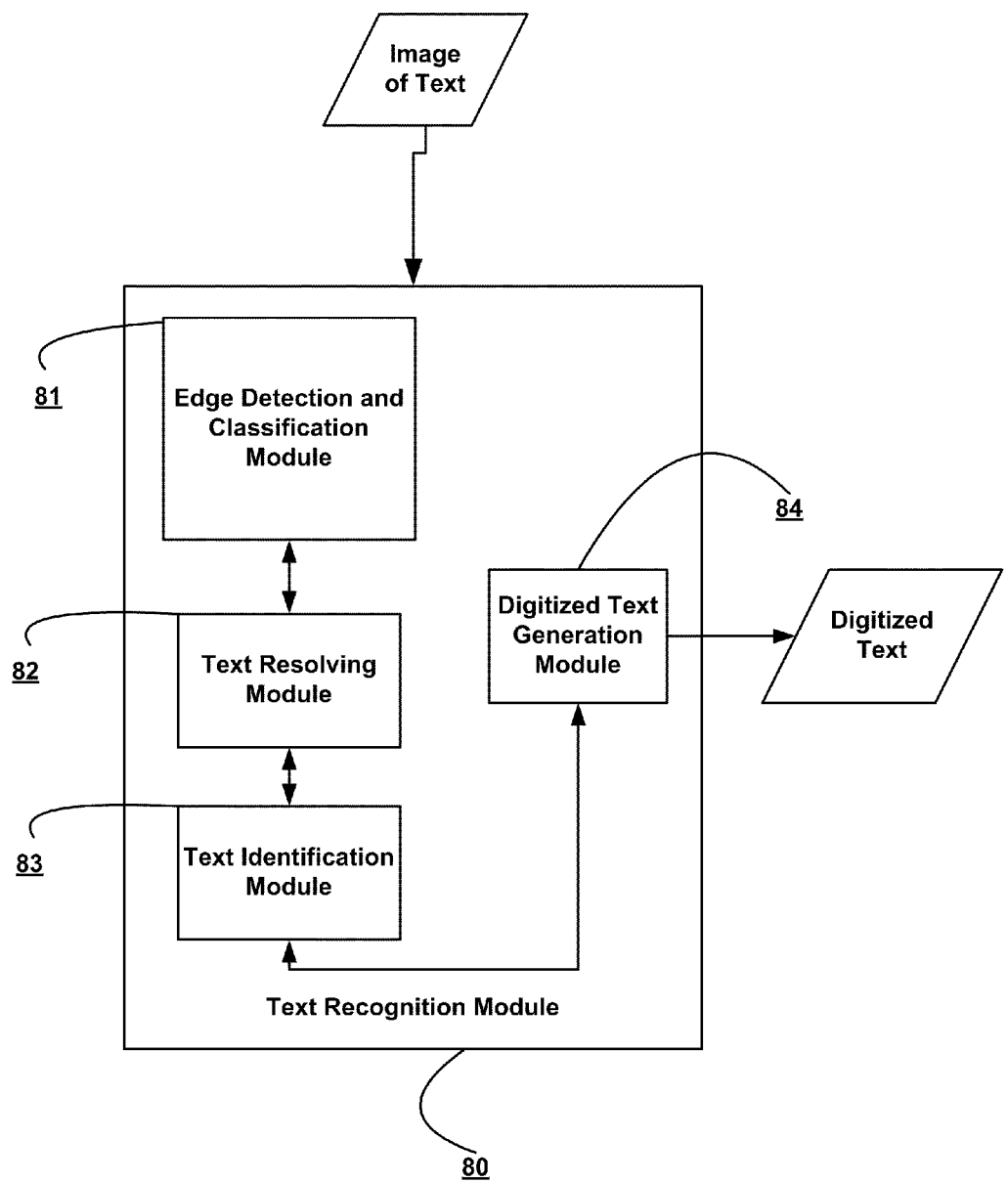
FIG. 19 depicts a text recognition module according to an exemplary embodiment of the invention.
Figure 20:
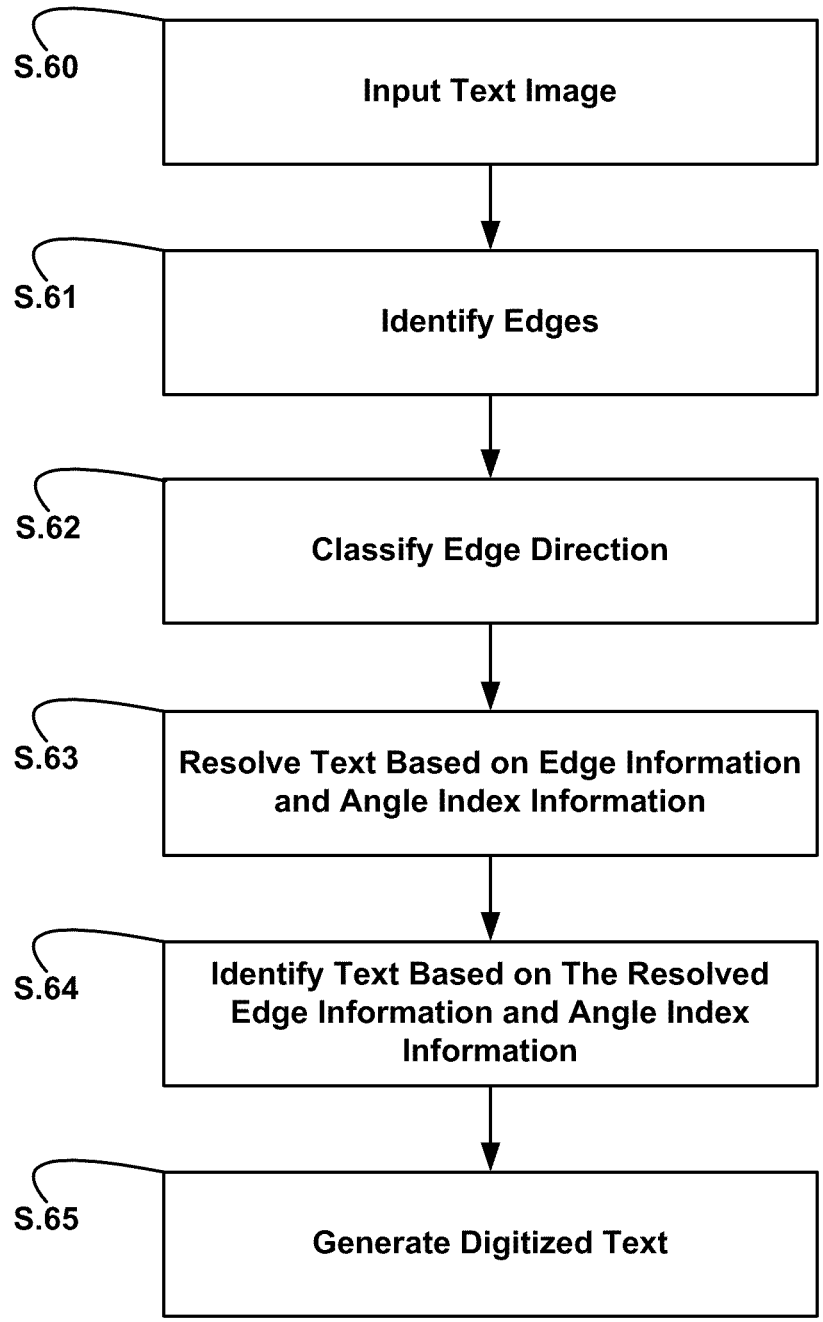
FIG. 20 is a flow chart illustrating an exemplary operation of the text recognition module illustrated in FIG. 19.
Figure 21:
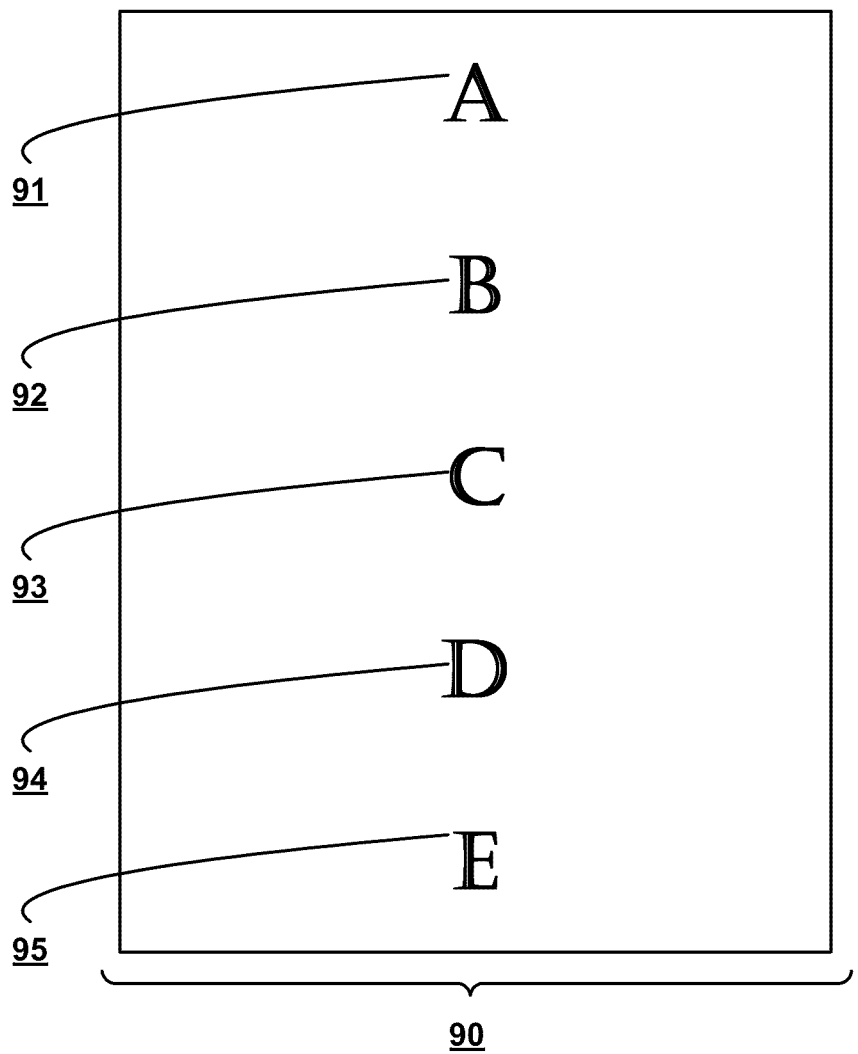
FIG. 21 is an illustration of a text image processable by the text recognition module illustrated in FIGS. 19 and 20.

FIGS. 19 through 21 illustrate another exemplary embodiment of the invention. In this exemplary embodiment, the image processing described in FIGS. 4 to 9 is incorporated into a Text Recognition Module 80. The edge detection/edge orientation classification algorithm described above is particularly suited for text recognition because of the ability of the algorithm to segment objects and identify the unique distribution of edge orientations associated with letters and numbers.

The Text Recognition Module 80 includes an Edge Detection and Classification Module 81, a Text Resolving Module 82, a Text Identification Module 83, and a Digitized Text Generation Module 84. The Edge Identification Module 81 includes an Edge Detection Module 82 and a Direction Classification Module 82.

FIG. 20 illustrates an exemplary operation of the Text Recognition Module 80. First, an image of text is input to the Text Recognition Module 80 (S.60). The text image may be without limitation a digital picture or a scanned image from a book. The text image may be without limitation a .tif, .jpeg, .pdf, .bmp, .gif, .raw, .ppm, .svg, or another format. For each pixel in the text image, the Edge Detection and Classification Module 81 utilizes the second order derivative of the intensity function to identify edges (S.61) and identify edge orientation information for each edge identified in the pixels of the text image (S.62). Next, the Text Resolving Module 82 uses the edge angle index information to resolve the angle index information into groups corresponding to units of text (e.g., individual letters, numbers and symbols) (S.63). Next, the Text Identification Module 83 utilizes the resolved edge detection information and angle index information to identify individual units of text (S.64). Finally, the Digitalized Text Generation Module 84 generates digitized text consisting of the identified text (S.65). The digitized text may be without limitation a text file, a word processing document, an image with text information embedded in the metadata, or a more robust data file, depending on the needs of the user.

Figure 22:
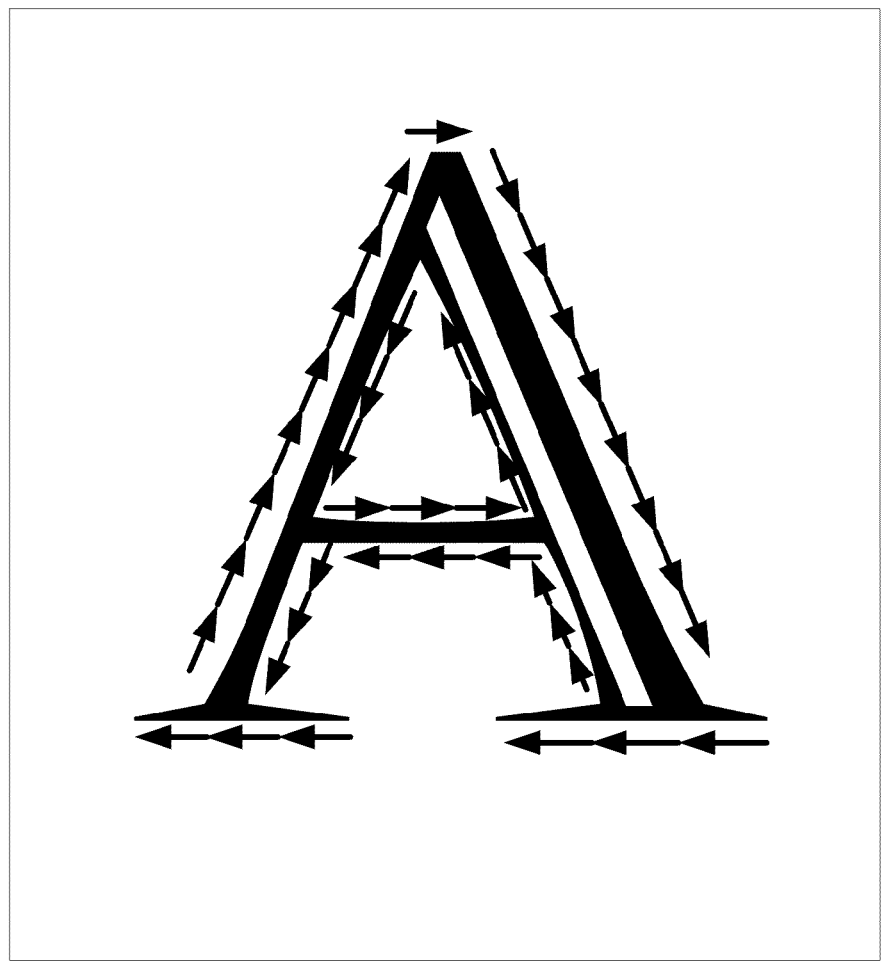
FIG. 22 is an illustration of a contour map that shows edge orientations identified by the text image recognition module illustrated in FIGS. 19 and 20 from the text in the text image illustrated in FIG. 21.

FIG. 21 illustrates a Text Image 90, according to an exemplary embodiment of the invention. The Text Image 90 consists of letters A 91, B 92, C 93, D 94, and E 95. The Text Image 90 is input to the Text Recognition Module 80. For each pixel of the Text Image 90, the Edge Detection and Classification Module 81 utilizes the second order derivative of the intensity function to identify the edges formed by the letters as well as the edge orientations. For each edge the Edge Detection and Classification Module 81 utilizes the algorithm described with regard to FIGS. 4 to 9 to generate angle index information. FIG. 22 is a contour map illustrating the angle index information associated just with the letter A 91. The angle index information is determined for all of the edges in Image 90, and the Text Resolving Module 82 resolves the angle index information into groups corresponding to the four letters in the Text Image 90. The Text Identification Module 83 utilizes the angle index information to identify the letters in the Text Image 90 based on the unique distributions of edge orientations for each of the letters. In the example of the letter A illustrated in FIG. 22, the unique distribution of the angle index information of the letter 'A' is matched to the distribution of the angle index information in the letter A 91 of Text Image 90. Finally, the Digitized Text Generation Module 86 generates a digitized text consisting of the identified letters 'A', 'B', 'C', 'D', and 'E'. As described above, methods of identifying the letters, numbers and symbols include HOG, the state method, etc.

The object/shape identification, traffic information, and text recognition embodiments described above do not encompass all of the applications of the present invention. Practical uses include anything that involves image processing. For example, the present invention is also useful in video or image editing, and in particular removing objects from images or frames of video. The user may select, roughly, the object in the image or frame to remove. A tool may then precisely identify the boundaries of the object within the area defined by the user according to the edge detection and orientation algorithm described above. An image editing tool can then, according to known methods, eliminate the edges from the pixels identified in the contour map, or even eliminate (or change) everything within the closed area defined by the detected edges. Clearly, there are many applications for the present invention.

Although the exemplary embodiments are described as processing images, the applications above are not limited to loading an entire image or video frame before processing it. Instead, portions of images may be processed in a manner consistent with the invention. As an image is captured and processed into a digital file, that is, as the digital image file is created, it may be processed using methods consistent with the invention. Row by row, column by column, or even pixel by pixel, edges and edge orientations may be detected and classified. This greatly increases the ability to process images in real time, as the images are created in the first instance. Digital cameras may include object identification modules consistent with the present invention, for example as a separate module or a co-processor to the image processing unit in the cameras. As images are captured and processed, the object identification module may generate a contour map or object list that can be stored as separate file associated with the image file, or added as meta-data to the image file, and could be used, for example, with image editing.

The exemplary embodiments are described as operating on a pixel by pixel basis. The invention is not so limited. For example, one of ordinary skill in the art would understand that the algorithms described above would be equally applicable to sub-pixels or macro-blocks of pixels. The level of granularity is scalable according to the needs of the user.

The terms "module," "function", and "algorithm," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), co-processor, FPGA, or ASIC. Thus, a module may include, by way of example, components, such as software components, object-oriented software components, class libraries, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

Certain exemplary embodiments of the invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Although each exemplary operation illustrated by FIGS. 4, 5, 8, 9, 11, 15, and 20, and the accompanying text recites steps performed in a particular order, embodiments of the present invention do not necessarily need to operate in that recited order. One of ordinary skill in the art would recognize many variations, including performing steps in a different order.

As explained above, the modules, algorithms, and systems shown in FIGS. 4, 5, 8-11, 14, 15, 19, 20 may incorporate, or be incorporated into, a computer system. Also, as explained above, the Image Processing Module 10, Traffic Sign Identification System 30, and Text Recognition Module 80 may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an AS/400-based operating system, a OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer systems in which the invention is embodied may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module. Compression algorithms may be a series of instructions in software executed by general-purpose processor, or may be executed in hardware, for example, in a compression specific co-processor. Compression algorithms are well known in the art, but include lossless and lossy compression. Lossless compression algorithms may include Lempel-Ziv Welch (LZW), Lempel-Ziv 1 through 7, arithmetic encoding, Huffman encoding, combinations thereof (e.g., Deflate) or any other lossless encoding algorithm. Lossy compression algorithms may include, MPEG1 through 4, MP3, MP4. Off-the-shelf compression software may be utilized including Gzip™, WinZip™, FZip, DivX, FACC, or any other off-the-shelf compression software.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

Furthermore, the memories of may be arranged inside and outside the computer. For example, in a network, the system memory may include (or be part of) a distributed storage system that provides both storage and file-system, such as network-attached-storage (NAS), or a distributed storage system that provides only storage, such as a storage-area-network (SAN). In the case of NAS, it may include software capable of file management services, including, without limitation, FreeNAS™, NASLite™, and NexentaStor™. The NAS may contain one or more hard disks, arranged into logical, redundant storage containers or RAID arrays. The NAS may utilize one or more file-based protocols including, without limitation, Network File System (NFS), Windows NT™ File System (NTFS), File Allocation Table (FAT), Server Message Block/Common Internet File System (SMB/CIFS), or Apple Filling Protocol (AFP).

In the case of SAN, it may use any number of protocols to communicate between server and storage, including, without limitation, the SCSI protocol, HyperSCSCI protocol, iSCSI protocol, ATA over Ethernet, Fibre channel Protocol, and Fibre Channel over Ethernet.

Information stored on the system memories may be stored in a database. The particular architecture of the database may vary according to the specific type of data, mode of access of the data, or intended use of the data stored in the database; including, without limitation, a row-oriented datastore architecture, a column-based database management system, extensible-markup language, a knowledgebase, a frame database, or combinations thereof. A database management system (DBMS) may organize the storage of the data in the database, tailored for the specific requirements of the present system. The DBMS may use any number of query languages to access the database, including, without limitation. structured query language (SQL).

The database may reside within a single storage device within a single computer, multiple storage devices within a single computer, or multiple storage devices across multiple computers.

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. The present system may utilize any number of transport protocols, including, without limitation User Datagram Protocol (UDP), Transmission Control Protocol (TCP), Venturi Transport Protocol (VTP), Datagram Congestion Control Protocol (DCCP), Fibre Channel Protocol (FCP), Stream Control Transmission Protocol (SCTP), Reliable User Datagram Protocol (RUDP), and Resource ReSerVation Protocol (RSVP). For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

What is claimed is:

1. An image processing device comprising:
   a processor that includes an edge detection and classification module that:
      detects an edge at a pixel in an image based on a zero-crossing at the pixel in a second order derivative of an intensity distribution along a horizontal direction and a zero-crossing at the pixel in a second order derivative of an intensity distribution along a vertical direction, and
      determines an edge orientation of the edge at the pixel based on the zero-crossings at the pixel and based on a zero-crossing at an adjacent pixel in a second order derivative of an intensity distribution along a horizontal direction and a zero-crossing at an adjacent pixel in a second derivative of an intensity distribution along a vertical direction.

2. The image processing device of claim 1, wherein the edge detection and classification module identifies edges and respective edge orientations on a pixel by pixel basis.

3. The image processing device of claim 1, wherein no zero-crossing is detected along the horizontal direction or vertical direction when no intensity transition at the pixel or adjacent pixel is observed in the horizontal direction or vertical direction.

4. The image processing device of claim 1, wherein the edge orientation is determined based on an angle and a direction of the zero-crossings at the pixel in the horizontal direction and the vertical direction and an angle and a direction of the zero-crossings at the adjacent pixel in the horizontal direction and the vertical direction.

5. The image processing device of claim 1, wherein the edge detection and classification module further:
   generates a horizontal matrix (H-matrix) that includes an entry for the pixel and an entry for the adjacent pixel that identifies angle information for zero-crossings respectively of the pixel and the adjacent pixel in the horizontal direction; and
   generates a vertical matrix (V-matrix) that includes an entry for the pixel and an entry for the adjacent pixel that identifies angle information for zero-crossings respectively of the pixel and the adjacent pixel in the vertical direction.

6. The image processing device of claim 5, wherein the edge detection and classification module further generates an entry for the pixel in an angle index matrix by comparing the H-matrixes and the V-matrixes of the pixel and the adjacent pixel to an angle mask that defines edge orientation of the edge at the pixel based on horizontal and vertical angle information for the zero-crossings at the pixel and the zero-crossings at the adjacent pixel.

7. The image processing device of claim 6, wherein the angle mask defines edge orientations that follow a contour of a shape formed by edges detected in the image.

8. The image processing device of claim 1, the processor further comprising an object resolving module that resolves determined edge orientation information according to particular objects in the image.

9. The image processing device of claim 8, the processor further comprising an object identification module that identifies the particular objects in the image based on the resolved edge orientation information.

10. The image processing device of claim 1, wherein the image is a traffic image, and the processor further comprises a traffic information identification module that identifies traffic information from an object formed by the detected edge.

11. The image processing device of claim 10, wherein the identified traffic information includes traffic sign types, speed limit information, emergency information, priority information, special regulation information, direction information, route markers, road and route identification information, attraction information, commercial information, and geographic information.

12. The image processing device of claim 10, the processor further comprising an object resolving module that resolves determined edge orientation information according to particular objects in the traffic image.

13. The image processing device of claim 10, the processor further comprising a traffic information report generation module that generates a report including the identified traffic information.

14. A method comprising:
a processor performing steps of:
determining a zero-crossing at a pixel of an image in a second order derivative of an intensity distribution along a horizontal direction and a zero-crossing at the pixel in a second order derivative of an intensity distribution along a vertical direction;
determining a zero-crossing at an adjacent pixel of the image in a second order derivative of an intensity distribution along a horizontal direction containing the adjacent pixel and a zero-crossing at the adjacent pixel in the second order derivative of an intensity distribution along a vertical direction; and
detecting an edge at the pixel and an orientation of the edge based on the zero-crossings at the pixel and the zero-crossings at the adjacent pixel.

15. The method claim 14, wherein detecting the orientation of the edge includes evaluating an angle and a direction of the zero-crossings at the pixel in the horizontal direction and the vertical direction and an angle and a direction of the zero-crossings at the adjacent pixel in the horizontal direction and the vertical direction.

16. The method of claim 14, further comprising:
generating a horizontal matrix (H-matrix) that includes an entry for the pixel and an entry for the adjacent pixel that identifies angle information for zero-crossings respectively of the pixel and the adjacent pixel in the horizontal direction;
generating a vertical matrix (V-matrix) that includes an entry for the pixel and an entry for the adjacent pixel that identifies angle information for zero-crossings respectively of the pixel and the adjacent pixel in the vertical direction; and
generating an entry for the pixel in an angle index matrix by comparing the H-matrixes and the V-matrixes of the pixel and the adjacent pixel to an angle mask that defines edge orientation of the edge at the pixel based on horizontal and vertical angle information for the zero-crossings at the pixel and the zero-crossings at the adjacent pixel.

17. The method of claim 14, further comprising disregarding pixels having no zero-crossings.

18. A non-transitory computer readable media encoded with instructions that, when executed, cause a processor to perform operations comprising:
determining a zero-crossing at a pixel of an image in a second order derivative of an intensity distribution along a horizontal direction and a zero-crossing at the pixel in a second order derivative of an intensity distribution along a vertical direction;
determining a zero-crossing at an adjacent pixel of the image in a second order derivative of an intensity distribution along a horizontal direction containing the adjacent pixel and a zero-crossing at the adjacent pixel in the second order derivative of an intensity distribution along a vertical direction; and
detecting an edge at the pixel and an orientation of the edge based on the zero-crossings at the pixel and the zero-crossings at the adjacent pixel.

19. The non-transitory media of claim 18, wherein detecting the orientation of the edge includes evaluating an angle and a direction of the zero-crossings at the pixel in the horizontal direction and the vertical direction and an angle and a direction of the zero-crossings at the adjacent pixel in the horizontal direction and the vertical direction.

20. The non-transitory media of claim 18, further operable to perform operations comprising disregarding pixels having no zero-crossings.

* * * * *